(12) United States Patent
Kurabayashi

(10) Patent No.: US 12,223,607 B2
(45) Date of Patent: Feb. 11, 2025

(54) MIXED REALITY SYSTEM, PROGRAM, MOBILE TERMINAL DEVICE, AND METHOD

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 18/501,702

(22) Filed: Nov. 3, 2023

(65) Prior Publication Data

US 2024/0071016 A1    Feb. 29, 2024

Related U.S. Application Data

(63) Continuation of application No. 17/181,456, filed on Feb. 22, 2021, which is a continuation of application No. PCT/JP2019/032969, filed on Aug. 23, 2019.

(30) Foreign Application Priority Data

Aug. 24, 2018  (JP) .................. 2018-157410

(51) Int. Cl.
  *G06T 19/00*      (2011.01)
  *A63F 13/213*     (2014.01)
  (Continued)

(52) U.S. Cl.
  CPC .......... *G06T 19/006* (2013.01); *A63F 13/213* (2014.09); *A63F 13/25* (2014.09);
  (Continued)

(58) Field of Classification Search
  CPC ......... G06T 19/006; G06T 2207/30204; G06T 7/73; A63F 13/25; A63F 13/213;
  (Continued)

(56) References Cited

U.S. PATENT DOCUMENTS 9,524,436 B2    12/2016  Salter et al.
9,892,560 B2 *   2/2018  Sudol ................ G06T 19/006
(Continued)

FOREIGN PATENT DOCUMENTS

JP    2009-020614 A    1/2009
JP    2017-076295 A    4/2017
(Continued)

OTHER PUBLICATIONS

S. Sanches, et al., "Mutual Occlusion between Real and Virtual Elements in Augmented Reality based on Fiducial Markers", 2012 IEEE Workshop on the Applications of Computer Vision (WACV), Jan. 9-11, 2012, pp. 49-54 (Year: 2012).*

(Continued)

*Primary Examiner* — Jin Cheng Wang
(74) *Attorney, Agent, or Firm* — Osha Bergman Watanabe & Burton LLP

(57) ABSTRACT

One or more embodiments of the invention is a mixed reality system for displaying a mixed-reality image on a display, the system including a mobile terminal device having the display and a photographing device. The system includes a plurality of feature point sets arranged in the prescribed real space. The mobile terminal device recognizes each of the feature point sets photographed by the photographing device, determines a viewpoint position of a virtual camera, in a virtual space, corresponding to a position and a photographing direction of the photographing device in the real space, based on arrangement position and posture information for each of the feature point sets and relative position and posture information of the mobile terminal device with respect to each of the feature point sets, and generates a mixed-reality image in which an image of the virtual object is superimposed on a photographed image of the real space.

12 Claims, 9 Drawing Sheets

(51) Int. Cl.
  *A63F 13/25* (2014.01)
  *A63F 13/525* (2014.01)
  *A63F 13/98* (2014.01)
  *G06F 3/01* (2006.01)
  *G06F 3/048* (2013.01)
  *G06T 7/73* (2017.01)
(52) U.S. Cl.
  CPC ............ *A63F 13/525* (2014.09); *A63F 13/98* (2014.09); *G06F 3/01* (2013.01); *G06F 3/048* (2013.01); *G06T 7/73* (2017.01); *G06T 2207/30204* (2013.01)
(58) Field of Classification Search
  CPC .......... A63F 13/525; A63F 13/98; G06F 3/01; G06F 3/0481
  See application file for complete search history.

(56) References Cited

U.S. PATENT DOCUMENTS

| | | | |
|---|---|---|---|
| 10,192,133 B2* | 1/2019 | Yang | G06T 7/73 |
| 10,192,361 B2 | 1/2019 | Li et al. | |
| 10,347,048 B2 | 7/2019 | Fu et al. | |
| 11,393,153 B2 | 7/2022 | Yan | |
| 2004/0104935 A1 | 6/2004 | Williamson et al. | |
| 2011/0090252 A1* | 4/2011 | Yoon | G06T 19/006 345/633 |
| 2013/0278635 A1 | 10/2013 | Maggiore | |
| 2014/0378022 A1 | 12/2014 | Muthyala et al. | |
| 2015/0130790 A1* | 5/2015 | Vasquez | G06T 19/006 345/419 |
| 2015/0221134 A1 | 8/2015 | Koga | |
| 2015/0302623 A1 | 10/2015 | Ishikawa | |
| 2015/0302649 A1 | 10/2015 | Komatsu | |
| 2016/0171773 A1* | 6/2016 | Hara | H04N 7/18 345/633 |
| 2016/0247320 A1* | 8/2016 | Yuen | G11B 27/00 |
| 2017/0109934 A1 | 4/2017 | Hasegawa | |
| 2019/0147658 A1 | 5/2019 | Kurabayashi | |
| 2019/0205586 A1* | 7/2019 | Haddadi | G06K 7/10722 |
| 2019/0318503 A1 | 10/2019 | Hama | |
| 2020/0003559 A1 | 1/2020 | Kawakami et al. | |
| 2020/0151450 A1 | 5/2020 | Hishinuma et al. | |
| 2021/0137634 A1 | 5/2021 | Lang | |
| 2021/0375025 A1 | 12/2021 | Yan | |

FOREIGN PATENT DOCUMENTS

| | | |
|---|---|---|
| JP | 2017-227975 A | 12/2017 |
| JP | 6410874 B1 | 10/2018 |
| WO | 2018/123022 A1 | 7/2018 |
| WO | 2018/147093 A1 | 8/2018 |

OTHER PUBLICATIONS

Romero-Ramirez, F. et al.; "Speeded up detection of squared fiducial markers"; Image and Vision Computing, vol. 76; Jun. 28, 2018 (14 pages).

Lowe, D.; "Distinctive Image Features from Scale Invariant Keypoints"; International Journal of Computer Vision, vol. 50, No. 2; Jan. 5, 2004 (28 pages).

Rublee, E. et al.; "ORB: and efficient alternative to SIFT or SURF"; IEEE International Conference on Computer Vision; Nov. 2011 (9 pages).

Kitagawa, G., "Monte Carlo Filter and Smoother for Non Gaussian Nonlinear State Space Models"; Journal of Computational and Graphical Statistics; vol. 5, No. 1; Mar. 1996 (6 pages).

Kurabayashi, S. et al., "Sensing By Overlaying: a Practical Implementation of a Multiplayer Mixed Reality Gaming System by Integrating a Dense Point Cloud and a Real Time Camera"; In Proceedings of the 2016 IEEE International Symposium on Multimedia (ISM); 2016 (4 pages).

Office Action issued in the counterpart Japanese Patent Application No. 2018-157410, mailed on Feb. 25, 2019 (6 pages).

Office Action issued in the counterpart Japanese Patent Application No. 2018-157410, mailed on Jul. 8, 2019 (6 pages).

* cited by examiner

MIXED REALITY SYSTEM, PROGRAM, MOBILE TERMINAL DEVICE, AND METHOD

TECHNICAL FIELD

The present invention relates to a mixed reality system, etc., particularly to a mixed reality system, etc. that makes it possible for a user present in a prescribed real space to experience a mixed reality.

BACKGROUND ART

Recently, mixed reality (MR) technology for seamlessly integrating the real world with a virtual world in real time has been known. MR technology makes it possible for a user experiencing MR technology to have an experience as if a virtual object is present in that location. Regarding MR technology, technology for executing MR itself with high accuracy such that an object in a virtual space is displayed without causing discomfort to a user has been developed. For example, NPL 1 discloses a system capable of recognizing a real space environment in a mixed reality environment in real time.

CITATION LIST

Patent Literature

PTL 1

Japanese Unexamined Patent Application, Publication No. 2017-227975

NPL 1

Francisco J. Romero-Ramirez, Rafael Munoz-Salinas, Rafael Medina-Carnicer, "Speeded up detection of squared fiducial markers," Image and Vision Computing, Volume 76, 2018, Pages 38-47, ISSN 0262-8856, DOI: 10.1016/j.imavis.2018.05.004.

NPL 2

David G Lowe, "Distinctive Image Features from Scale-Invariant Keypoints," International Journal of Computer Vision, vol.50, No. 2, 2004, pp.91-110.

NPL 3

Ethan Rublee, Vincent Rabaud, Kurt Konolige and Gary Bradski, "ORB: and efficient alternative to SIFT or SURF," IEEE International Conference on Computer Vision, 2011.

NPL 4

Genshiro Kitagawa, "Monte Carlo Filter and Smoother for Non-Gaussian Nonlinear State Space Models," Journal of Computational and Graphical Statistics, Vol. 5, No. 1 (March, 1996), pp. 1-25

NPL 5

Shuichi Kurabayashi, Hidetoshi Ishiyama, and Masaru Kanai, "Sensing By Overlaying: a Practical Implementation of a Multiplayer Mixed-Reality Gaming System by Integrating a Dense Point Cloud and a Real-Time Camera," In Proceedings of the 2016 IEEE International Symposium on Multimedia (ISM), pages 636-639, San Jose, CA, DOI: 10.1109/ISM.2016.0136, (2016)

SUMMARY OF INVENTION

Technical Problem

Conventionally, the target of MR technology has been a real space within a sensor observation range, and it has been difficult to realize MR in a wide space. For example, in an outdoor space, it has been difficult to realize an MR in which a virtual huge robot flies between buildings.

The present invention has been made in order to solve the problem described above, and the chief object thereof is to provide a mixed reality system, etc. that makes it possible for a user to experience, in a relatively wide space such as an outdoor space, MR according to the location.

Solution to Problem

In order to achieve the above object, a system according to an aspect of the present invention is a mixed reality system for displaying, on a display for displaying a virtual object to a user present in a prescribed real space, a mixed-reality image in which an image of the virtual object arranged in a virtual space corresponding to the real space is superimposed on a photographed image of the real space, the mixed reality system including a mobile terminal device having the display and a photographing device that photographs the real space, characterized in that: the mixed reality system includes a plurality of feature point sets arranged in the prescribed real space, the feature point sets including identifiable information that allows identification of each of the feature point sets, and at least three feature point sets among the plurality of feature point sets being arranged so as to have predefined positional relationships, and the mobile terminal device stores data, obtained in advance, of a first virtual object that corresponds to a real object present in the prescribed real space and that defines the virtual space, and data of a second virtual object, in the virtual space, that does not correspond to the real object, stores arrangement position and posture information in the virtual space for each of the feature point sets arranged in the prescribed real space, recognizes each of the feature point sets photographed by the photographing device, determines a viewpoint position of a virtual camera, in the virtual space, corresponding to a position and a photographing direction of the photographing device in the real space, on the basis of the arrangement position and posture information for each of the feature point sets, the arrangement position and posture information being obtained from the identifiable information of some or all of the recognized feature point sets, and relative position and posture information of the mobile terminal device with respect to each of the feature point sets, the relative position and posture information being determined from shapes and sizes of the feature point sets, and on the basis of the data of the first virtual object, the data of the second virtual object, and the viewpoint position, generates a mixed-reality image in which an image of the second virtual object according to the viewpoint position is superimposed on the photographed image of the real space.

Furthermore, in the present invention, preferably, in the case where the first virtual object and the second virtual object overlap each other in a field-of-view range of the virtual camera when the mixed-reality image is generated, if a depth distance of the second virtual object from the viewpoint position is larger than that of the first virtual object, the mobile terminal device generates a mixed-reality image in which the image of the second virtual object with overlapping parts removed is superimposed.

Furthermore, in the present invention, preferably, the mixed reality system includes five or more feature point sets, and the mobile terminal device, at prescribed time intervals, recognizes each of the feature point sets photographed by the photographing device, determines the viewpoint position, and generates the mixed-reality image.

Furthermore, in the present invention, preferably, the mixed reality system includes four feature point sets arranged in the prescribed real space, and the individual feature point sets have positional relationships corresponding to four vertex positions of a virtual rectangle in the real space and are arranged away from each other by a predefined distance in a vertical direction and a predefined distance in a horizontal direction.

Furthermore, in the present invention, preferably, one or a plurality of the feature point sets are securely attached to each of a plurality of rod-like bodies installed in a horizontally-isolated manner.

Furthermore, in the present invention, preferably, each of the feature point sets is securely attached to a transmission member formed of a light transmitting material.

Furthermore, in the present invention, preferably, each of the feature point sets is securely attached by using a wire.

Furthermore, in the present invention, preferably, the feature point sets are posters, paintings, pictures, ArUco markers, AR markers, two-dimensional codes, or data matrices.

In order to achieve the above object, a program according to an aspect of the present invention is a program executed by a mobile terminal device in a mixed reality system for displaying, on a display for displaying a virtual object to a user present in a prescribed real space, a mixed-reality image in which an image of the virtual object arranged in a virtual space corresponding to the real space is superimposed on a photographed image of the real space, the mixed reality system including the mobile terminal device having the display and a photographing device that photographs the real space, characterized in that: the mixed reality system includes a plurality of feature point sets arranged in the prescribed real space, the feature point sets including identifiable information that allows identification of each of the feature point sets, and at least three feature point sets among the plurality of feature point sets being arranged so as to have predefined positional relationships, and the program causes the mobile terminal device to execute a step of recognizing each of the feature point sets photographed by the photographing device, a step of determining a viewpoint position of a virtual camera, in the virtual space, corresponding to a position and a photographing direction of the photographing device in the real space, on the basis of arrangement position and posture information in the virtual space in which each of the feature point sets is arranged, the arrangement position and posture information being obtained from the identifiable information of some or all of the recognized feature point sets, and relative position and posture information of the mobile terminal device with respect to each of the feature point sets, the relative position and posture information being determined from shapes and sizes of the feature point sets, and a step of generating a mixed-reality image in which an image of a second virtual object according to the viewpoint position is superimposed on a photographed image of the real space, on the basis of data, obtained in advance, of a first virtual object that corresponds to a real object present in the prescribed real space and that defines the virtual space, data of the second virtual object, in the virtual space, that does not correspond to the real object, and the viewpoint position.

Furthermore, in order to achieve the above object, a mobile terminal device according to an aspect of the present invention is a mobile terminal device in a mixed reality system for displaying, on a display for displaying a virtual object to a user present in a prescribed real space, a mixed-reality image in which an image of the virtual object arranged in a virtual space corresponding to the real space is superimposed on a photographed image of the real space, the mixed reality system including the mobile terminal device having the display and a photographing device that photographs the real space, characterized in that: the mixed reality system includes a plurality of feature point sets arranged in the prescribed real space, the feature point sets including identifiable information that allows identification of each of the feature point sets, and at least three feature point sets among the plurality of feature point sets being arranged so as to have predefined positional relationships; and the mobile terminal device stores data, obtained in advance, of a first virtual object that corresponds to a real object present in the prescribed real space and that defines the virtual space, and data of a second virtual object, in the virtual space, that does not correspond to the real object, stores arrangement position and posture information in the virtual space for each of the feature point sets arranged in the prescribed real space, and recognizes each of the feature point sets photographed by the photographing device, determines a viewpoint position of a virtual camera, in the virtual space, corresponding to a position and a photographing direction of the photographing device in the real space, on the basis of the arrangement position and posture information for each of the feature point sets, the arrangement position and posture information being obtained from the identifiable information of some or all of the recognized feature point sets, and relative position and posture information of the mobile terminal device with respect to each of the feature point sets, the relative position and posture information being determined from shapes and sizes of the feature point sets, and on the basis of the data of the first virtual object, the data of the second virtual object, and the viewpoint position, generates a mixed-reality image in which an image of the second virtual object according to the viewpoint position is superimposed on the photographed image of the real space.

Furthermore, in order to achieve the above object, a method according to an aspect of the present invention is a method executed by a mobile terminal device in a mixed reality system for displaying, on a display for displaying a virtual object to a user present in a prescribed real space, a mixed-reality image in which an image of the virtual object arranged in a virtual space corresponding to the real space is superimposed on a photographed image of the real space, the mixed reality system including the mobile terminal device having the display and a photographing device that photographs the real space, characterized in that: the mixed reality system includes a plurality of feature point sets arranged in the prescribed real space, the feature point sets including identifiable information that allows identification of each of the feature point sets, and at least three feature point sets among the plurality of feature point sets being arranged so as to have predefined positional relationships; and the method includes a step of recognizing each of the feature point sets photographed by the photographing device, a step of determining a viewpoint position of a virtual camera, in the virtual space, corresponding to a position and a photographing direction of the photographing device in the real space, on the basis of arrangement position and posture information in the virtual space in which each of the feature point sets is arranged, the arrangement position and posture information being obtained from the identifiable information of some or all of the recognized feature point sets, and relative position and posture information of the mobile terminal device with respect to each of the feature point sets, the relative position and posture information being determined from shapes and sizes of the feature point sets, and a step of generating a mixed-reality image in which an image of a second virtual object according to the viewpoint position is superimposed on the photographed image of the real space, on the basis of data, obtained in advance, of a first virtual object that corresponds to a real object present in the prescribed real space and that defines the virtual space, data of the second virtual object, in the virtual space, that does not correspond to the real object, and the viewpoint position.

Furthermore, in order to achieve the above object, a system according to an aspect of the present invention is a mixed reality system for displaying, on a display for displaying a virtual object to a user present in a prescribed real space, a mixed-reality image in which an image of the virtual object arranged in a virtual space corresponding to the real space is superimposed on a photographed image of the real space, the mixed reality system including a server and a mobile terminal device having the display and a photographing device that photographs the real space, characterized in that: the mixed reality system includes a plurality of feature point sets arranged in the prescribed real space, the feature point sets including identifiable information that allows identification of each of the feature point sets, and at least three feature point sets among the plurality of feature point sets being arranged so as to have predefined positional relationships; the server stores data, obtained in advance, of a first virtual object that corresponds to a real object present in the prescribed real space and that defines the virtual space, and data of a second virtual object, in the virtual space, that does not correspond to the real object, stores arrangement position and posture information in the virtual space for each of the feature point sets arranged in the prescribed real space; and the mobile terminal device recognizes each of the feature point sets photographed by the photographing device, determines a viewpoint position of a virtual camera, in the virtual space, corresponding to a position and a photographing direction of the photographing device in the real space, on the basis of the arrangement position and posture information for each of the feature point sets, the arrangement position and posture information being obtained from the identifiable information of some or all of the recognized feature point sets, and relative position and posture information of the mobile terminal device with respect to each of the feature point sets, the relative position and posture information being determined from shapes and sizes of the feature point sets, and on the basis of the data of the first virtual object, the data of the second virtual object, and the viewpoint position, generates a mixed-reality image in which an image of the second virtual object according to the viewpoint position is superimposed on the photographed image of the real space.

Furthermore, in order to achieve the above object, a system according to an aspect of the present invention is a mixed reality system for displaying, on a display for displaying a virtual object to a user present in a prescribed real space, a mixed-reality image in which an image of the virtual object arranged in a virtual space corresponding to the real space is superimposed on a photographed image of the real space, the mixed reality system including a mobile terminal device having the display and a photographing device that photographs the real space, characterized in that: the mixed reality system includes a plurality of feature point sets arranged in the prescribed real space, the feature point sets including identifiable information that allows identification of each of the feature point sets, and at least three feature point sets among the plurality of feature point sets being arranged so as to have predefined positional relationships; the mobile terminal device stores data, obtained in advance, of a first virtual object that corresponds to a real object present in the prescribed real space and that defines the virtual space, and data of a second virtual object, in the virtual space, that does not correspond to the real object, stores arrangement position and posture information in the virtual space for each of the feature point sets arranged in the prescribed real space, recognizes each of the feature point sets photographed by the photographing device, determines position and posture information of the first virtual object on the basis of the arrangement position and posture information for each of the feature point sets, the arrangement position and posture information being obtained from the identifiable information of some or all of the recognized feature point sets, and relative position and posture information of the mobile terminal device with respect to each of the feature point sets, the relative position and posture information being determined from shapes and sizes of the feature point sets, and on the basis of the data of the first virtual object and the data of the second virtual object, generates a mixed-reality image in which an image of the second virtual object according to the viewpoint position is superimposed on the photographed image of the real space.

Furthermore, in order to achieve the above object, a program according to an aspect of the present invention is a program executed by a mobile terminal device in a mixed reality system for displaying, on a display for displaying a virtual object to a user present in a prescribed real space, a mixed-reality image in which an image of the virtual object arranged in a virtual space corresponding to the real space is superimposed on a photographed image of the real space, the mixed reality system including the mobile terminal device having the display and a photographing device that photographs the real space, characterized in that: the mixed reality system includes a plurality of feature point sets arranged in the prescribed real space, the feature point sets including identifiable information that allows identification of each of the feature point sets, and at least three feature point sets among the plurality of feature point sets being arranged so as to have predefined positional relationships; and the program causes the mobile terminal device to execute a step of recognizing each of the feature point sets photographed by the photographing device, a step of determining position and posture information of a first virtual object, obtained in advance, that corresponds to a real object present in the prescribed real space and that defines the virtual space, on the basis of arrangement position and posture information in the virtual space in which each of the feature point sets is arranged, the arrangement position and posture information being obtained from the identifiable information of some or all of the recognized feature point sets, and relative position and posture information of the mobile terminal device with respect to each of the feature point sets, the relative position and posture information being determined from shapes and sizes of the feature point sets, and a step of generating a mixed-reality image in which an image of a second virtual object according to a viewpoint position is superimposed on the photographed image of the real space, on the basis of data of the first virtual object and data of the second virtual object, in the virtual space, that does not correspond to the real object.

Advantageous Effects of Invention

According to the present invention, it is possible for a user to experience, in a relatively wide space such as an outdoor space, MR according to the location.

DESCRIPTION OF EMBODIMENT

Now, a mixed reality (MR) system that provides a user with a mixed reality space in which a virtual space and a real space are mixed together will be described with reference to the drawings. In this specification, for convenience of description, descriptions that are more detailed than necessary may be omitted. For example, detailed descriptions about well-known matters or repeated descriptions about substantially the same configurations may be omitted. Note that, in each figure, the same signs indicate the same or corresponding parts unless specifically mentioned otherwise.

An MR system according to this embodiment allows a user to experience an MR by rendering, in a superimposed fashion, a virtual object, which is an object arranged in a virtual space corresponding to a real space, on a photographed real space image visually recognized by a user through, for example, the screen of a smartphone.

Figure 1:
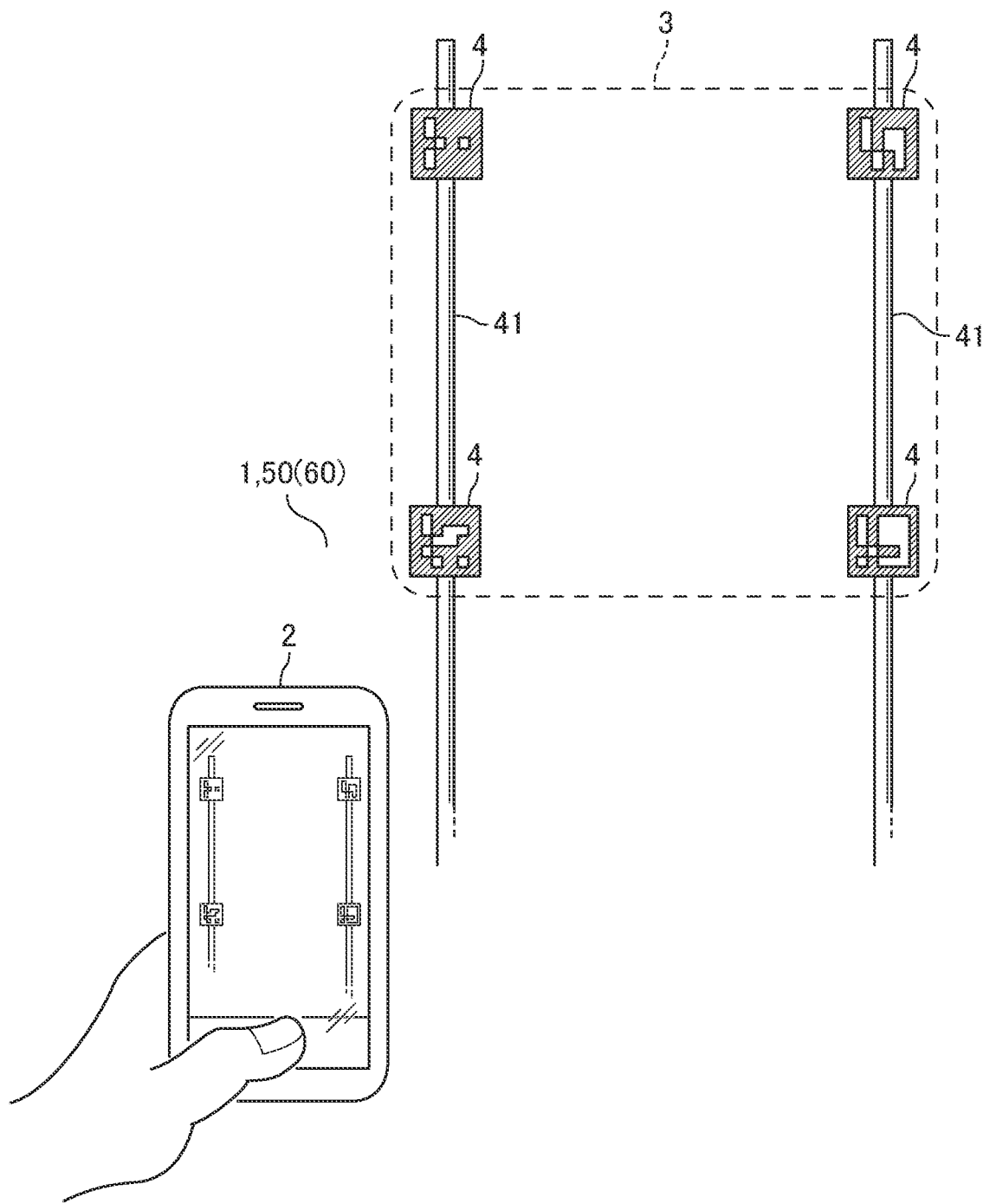
FIG. 1 is a schematic illustration showing part of a mixed reality system according to an embodiment of the present invention.

FIG. 1 is a schematic illustration showing part of a mixed reality system (MR system) 1 according to an embodiment of the present invention. The MR system 1 according to the embodiment of the present invention is realized in a predefined prescribed real space (real space 50). The real space 50 is a predefined outdoor real space, and in that space, real objects, which are objects in the real world, exist. For example, the real objects are structures such as buildings, bridges, and walls, which are stationary in the real space. However, mobile items may be included in the real objects. Furthermore, the real space 50 may be an indoor real space instead of an outdoor real space, and may partly include the indoor real space.

As shown in FIG. 1, the MR system 1 includes a mobile terminal device 2, and a feature point set cloud 3 that includes a plurality of feature point sets 4 arranged in the real space 50.

Figure 2:
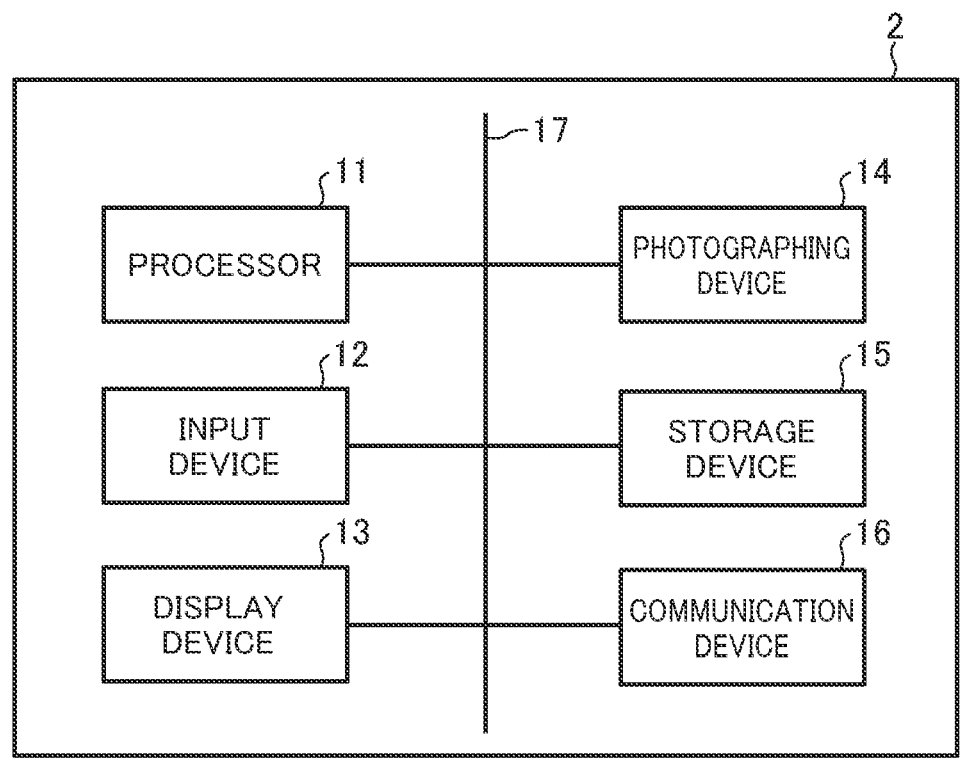
FIG. 2 is a block diagram showing the hardware configuration of a mobile terminal device according to the embodiment of the present invention.

FIG. 2 is a block diagram showing the hardware configuration of the mobile terminal device 2 according to the embodiment of the present invention. The mobile terminal device 2 includes a processor 11, an input device 12, a display device 13, a photographing device 14, a storage device 15, and a communication device 16. These constituent devices are connected via a bus 17. Note that interfaces are interposed between the bus 17 and the individual constituent devices as needed. In this embodiment, the mobile terminal device 2 is a smartphone. However, the mobile terminal device 2 may be a terminal such as a tablet computer or a computer equipped with a contact-type input device, such as a touchpad, as long as the terminal is a portable terminal having the above-described configuration.

The processor 11 controls the overall operation of the mobile terminal device 2. For example, the processor 11 is a CPU. Alternatively, an electronic circuit such as an MPU may be used as the processor 11. The processor 11 executes various kinds of processing by loading programs and data stored in the storage device 15 and executing the programs. In one example, the processor 11 is constituted of a plurality of processors.

The input device 12 is a user interface that accepts an input to the mobile terminal device 2 from a user. The display device (display) 13 displays an application screen, an image photographed by the photographing device 14, or the like to the user of the mobile terminal device 2 in accordance with the control by the processor 11. In this embodiment, the mobile terminal device 2, which is a smartphone, includes a touchscreen as the input device 12, the touchscreen also functions as the display device 13, and the input device 12 and the display device 13 are constructed in an integrated form. However, the input device 12 and the display device 13 may be disposed at different positions as separate units. In this case, the input device 12 may be, for example, a touchpad or a button, and the display device 13 may be a liquid crystal display, a display using an organic EL, a plasma display, or the like.

The photographing device (image capturing device) 14 photographs (captures) a still picture or a moving picture of a real space and stores the photographed image or moving picture data in the storage device 15. The photographing device 14 is, for example, a camera constituted of an image sensor.

The storage device 15 is a storage device provided in a general smartphone and including a RAM, which is a volatile memory, and a ROM, which is a non-volatile memory. The storage device 15 may include an external memory.

In one example, the storage device 15 includes a main storage device and an auxiliary storage device. The main storage device is a volatile storage medium that allows high-speed reading and writing of information and is used as a storage area and a work area when the processor 11 processes information. The auxiliary storage device stores various programs and data that is used by the processor 11 when executing the individual programs. The auxiliary storage device is, for example, a hard disk device, but may be any kind of non-volatile storage or non-volatile memory that is capable of storing information, and may be of the removable type. For example, the auxiliary storage device stores an operating system (OS), middleware, application programs, various kinds of data that may be referred to as these programs are executed, etc.

The communication device 16 sends data to and receives data from other computers via a network such as the Internet. For example, the communication device 16 carries out wireless communications such as mobile communications or wireless LAN communications to connect to the network. In one example, the communication device 16 downloads a program from a server and stores the program in the storage device 15. However, the communication device 16 may carry out wired communications using an Ethernet (registered trademark) cable or the like. In the case where data is not sent to or received from other computers, the mobile terminal device 2 need not include the communication device 16.

Feature point sets 4 indicate local feature point sets and, in this embodiment, the feature point sets 4 are ArUco markers (NPL 1). The feature point sets 4 are arranged and fixed in the real space 50 in advance. Each of the feature point sets 4 is associated with unique identification information (ID). However, it suffices that each of the feature point sets 4 includes identifiable information that makes it possible to identify each of the feature point sets 4. Identification information is an example of the identifiable information. Furthermore, the feature point sets 4 are not limited to the ArUco markers.

Figure 3:
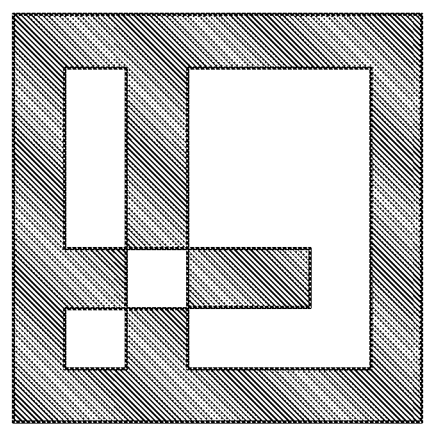
FIG. 3 is a diagram showing a two-dimensional code according to the embodiment of the present invention.

FIG. 3 is a diagram showing a feature point set 4 according to the embodiment of the present invention. The feature point set 4 is constituted of white and black squares and has a square shape as a whole. The black squares are arranged at positions constituting the outer edge of the feature point set 4. The white and black squares are arranged at different positions in each feature point set 4, and an ID (for example, ID number) is assigned according to the arrangement position. For example, the feature point set 4 is made by performing printing on a metal plate having a flat surface by using a pigment, or attaching the metal plate after printing to another support, and the metal plate is coated for sunlight reflection prevention.

It suffices that the feature point set 4 makes it possible to identify each feature point set 4 and is arranged and fixed in the real space 50, and thus is not limited to the above-described example. The feature point set 4 may be made by printing the pattern of the feature point set 4 itself, or may be made by including the pattern of the feature point set 4 itself in what is printed. For example, the feature point set 4 has a square shape, the side length of which is 10 cm.

As shown in FIG. 1, the feature point set cloud 3 includes four feature point sets 4, and each of the feature point sets 4 is securely attached, in a vertically-isolated manner, to each of a pair of rod-like bodies 41 installed in a horizontally-isolated manner. For example, the rod-like bodies 41 are fixed poles or columns, and are securely attached to the ground. The individual feature point sets 4 included in the feature point set cloud 3 have positional relationships corresponding to four vertex positions of virtual rectangles in the real space 50, and are arranged away from each other by a predefined distance in the vertical direction and a predefined distance in the horizontal direction. Preferably, two sides constituting a virtual rectangle are parallel to each other in the perpendicular direction (vertical direction) and the horizontal direction. Note that the feature point set cloud 3 indicates a plurality of feature point sets 4. The feature point set cloud 3 may indicate a plurality of feature point sets 4 that are locally present, or may indicate a plurality of feature point sets 4 included in a single photographed image photographed by the photographing device 14. Furthermore, the MR system 1 may include a plurality of feature point set clouds 3.

Figure 4:
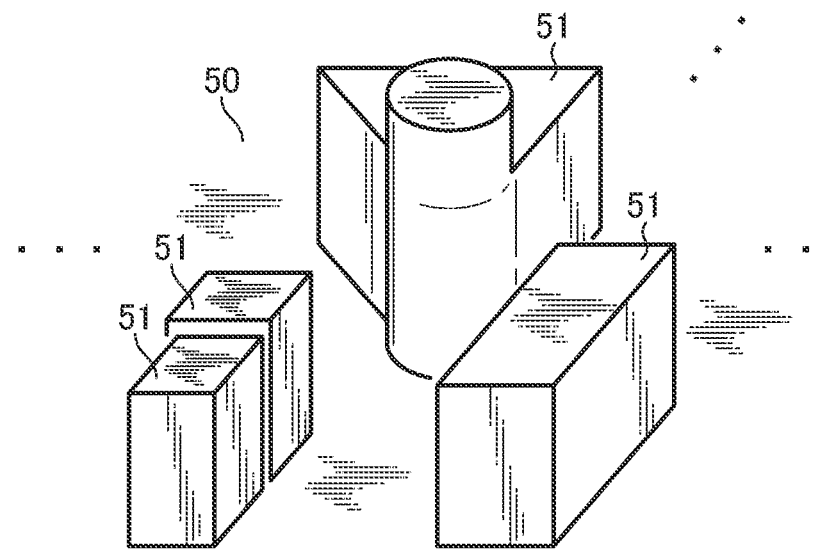
FIG. 4 is a schematic illustration showing part of a real space according to the embodiment of the present invention.

In this embodiment, the real space 50 is an area with a range of a few kilometers square, such as the whole area around Shibuya station. FIG. 4 is a schematic illustration showing part of the real space 50 according to the embodiment of the present invention. The real space 50 includes a real object 51 such as a building.

A virtual space 60 is a virtual space associated with the real space 50, and a position in the real space 50 and a position in the virtual space 60 are associated with each other on a one-to-one basis. The MR system 1 uses, in the virtual space 60, three-dimensional space data representing the real object 51 present in the real space 50. Thus, the three-dimensional space data defines the virtual space 60 associated with the real space 50, and represents the three-dimensional shape of the real object 51. The three-dimensional space data is obtained in advance, and each item of three-dimensional space data is constituted of a three-dimensional shape element, which is a basic unit having three-dimensional position information in the virtual space 60. This basic unit will be referred to as a three-dimensional shape element. In this embodiment, a three-dimensional mesh is used as the three-dimensional shape element. Thus, the three-dimensional space data is constituted of the three-dimensional mesh. The three-dimensional mesh is formed of one or more polygons, and at least one of vertices of polygons constituting each three-dimensional mesh has the three-dimensional position information. However, the three-dimensional shape element may be point cloud data or the like.

The three-dimensional position information possessed by the three-dimensional shape element is position information in the real space 50 corresponding to position information in the virtual space 60. Here, the position information in the real space 50 is, for example, a 6DoF (6 axes) value including a latitude, a longitude, an altitude, and a direction, and the position information in the virtual space 60 is also a corresponding 6DoF value.

Recently, three-dimensional mesh data of a relatively wide area, which is the area of interest for the real space 50 in this embodiment, is provided by various companies, and it is possible to obtain accurate three-dimensional mesh data relatively easily.

Figure 5:
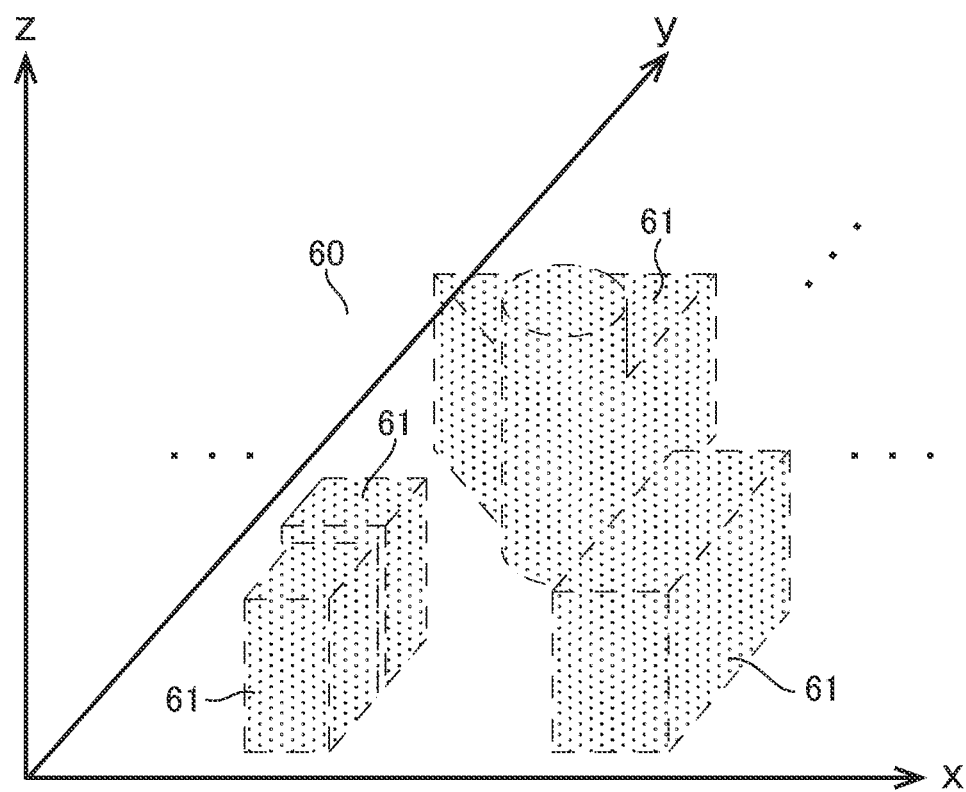
FIG. 5 is a diagram showing a virtual space corresponding to the real space shown in FIG. 4.

For example, three-dimensional mesh data as described above is obtained in advance as follows. First, a highly accurate laser scanner is used to obtain, in advance, point cloud data indicating the three-dimensional shape of the real object 51 in the real space 50. FIG. 5 shows an example of point cloud data in the virtual space 60 associated with the real space 50. For example, each item of point cloud data has three-dimensional coordinates (x, y, z) and is arranged in the virtual space 60 associated with the real space 50. Note that each item of point cloud data is color point cloud data including color information. Next, from the color point cloud data obtained as described above, polygons having the individual point clouds as vertices are formed by using a known method. A three-dimensional mesh is formed of the polygons. However, since a three-dimensional shape element constituting three-dimensional space data does not need to have color information, in the above-described example, the point cloud data ned not have color information. In another example, a three-dimensional mesh is generated from a plurality of photographed images in the real space 50 by using a known method.

FIG. 5 shows the virtual space 60 corresponding to the real space 50 shown in FIG. 4, and also shows a first virtual object 61, which is a virtual object corresponding to the real object 51 present in the real space 50. Although all of the objects arranged in the virtual space 60 are virtual objects, for convenience of description, a virtual object corresponding to the real object 51 will be referred to as the first virtual object 61, and a virtual object that does not correspond to the real object 51, i.e., a virtual object that is not present in the real space 50 will be referred to as the second virtual object 62. Thus, three-dimensional space data is data of the first virtual object 61, and the virtual space 60 is defined by the data of the first virtual object 61. In this embodiment, for example, the coordinates of three-dimensional space data means the same as the coordinates of the virtual space 60.

A position in the virtual space 60 is determined by using 6DoF including three-dimensional coordinates (x, y, z), as shown in FIG. 5. However, since the three-dimensional coordinates in the virtual space 60 shown in FIG. 5 are an example, the origin of the three-dimensional coordinates may be set to any position, and individual coordinate axes may have any directions as long as the coordinate axes are orthogonal to each other. Alternatively, regarding a position in the virtual space 60, a three-dimensional position may be determined by using other kinds of coordinate system.

Figure 6:
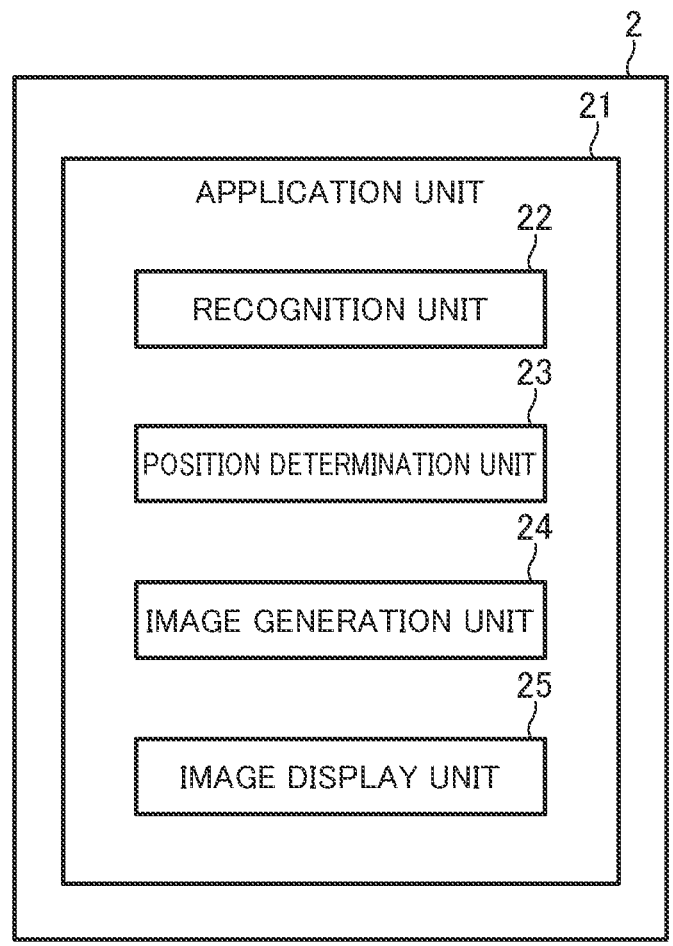
FIG. 6 is the functional block diagram of the mobile terminal device according to the embodiment of the present invention.

FIG. 6 is the functional block diagram of the mobile terminal device 2 according to the embodiment of the present invention. The mobile terminal device 2 includes an application unit 21. The application unit 21 includes a recognition unit 22, a position determination unit 23, an image generation unit 24, and an image display unit 25. In this embodiment, these functions are realized by the execution of programs by the processor 11. In this embodiment, since various functions are realized by loading programs, a portion of one part (function) may be included in another part. However, these functions may be realized with hardware by configuring an electronic circuit or the like for realizing a portion or the entirety of each of the functions.

On the mobile terminal device 2, an OS is installed and an application running on the OS for the purpose of allowing a user to experience MR is also installed. The application unit 21 corresponds to this application and is stored in the storage device 15 as an application program.

Figure 7:
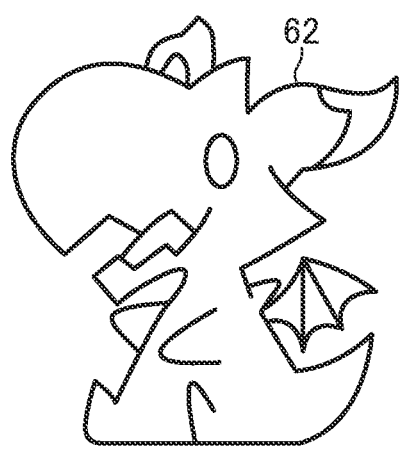
FIG. 7 is an example of an image of a second virtual object.

The storage device 15 stores data of the first virtual object 61, in the virtual space 60, corresponding to the real object 51 present in the real space 50, and data of the second virtual object 62 in the virtual space 60. In this embodiment, the data of the second virtual object 62 is also formed of a three-dimensional mesh, and position information included in the data of the second virtual object is represented by the coordinates of three-dimensional space data or is associated with the coordinates of the three-dimensional space data. In one example, the second virtual object 62 is a virtual character or a virtual item. FIG. 7 is an example of an image of the second virtual object 62. In one example, the data of the second virtual object 62 is the data of a virtual object in which at least one of the shape, size, or orientation changes in accordance with at least one of position and time.

The storage device 15 stores feature point set position data in which the IDs of individual feature point sets 4 are associated with arrangement position information in the virtual space 60, the arrangement position information corresponding to position information in the real space 50 in which the individual feature point sets 4 are arranged. The arrangement position information here is represented by the coordinates of three-dimensional space data or is associated with the coordinates of the three-dimensional space data.

Furthermore, to be more precise, the arrangement position information is arrangement position and posture information and is, for example, a 6DoF (six degrees of freedom) value. Thus, for example, the arrangement position information (arrangement position and posture information) is position and posture information of the feature point sets 4 using a prescribed position of the first virtual object 61 (origin of the virtual space 60) as the origin. Note that, similarly to the case where ArUco is generally used, the storage device 15 stores a software module for using ArUco, and the application unit 21 uses this module to associate the individual feature point sets 4 with the IDs.

In one example, the storage device 15 stores three-dimensional space data with a program for causing the three-dimensional space data to function as a three-dimensional space database. For example, in this case, the application unit 21 uses combinations of the IDs of the recognized individual feature point sets 4 to query a three-dimensional space database, thereby obtaining three-dimensional space data according to the combinations of the IDs.

The application unit 21 starts the photographing device 14 when an application is started by a user operation or the like. The recognition unit 22 recognizes individual feature point sets 4 photographed by the photographing device 14. For example, the recognition unit 22 recognizes the feature point sets 4 on the basis of the outer edges of the feature point sets 4 and the arrangement positions of the white and black squares of the feature point sets 4, and recognizes the IDs of the feature point set 4. Preferably, the recognition unit 22 recognizes, at prescribed time intervals such as 0.5 s, the individual feature point sets 4 photographed by the photographing device 14.

The position determination unit 23 determines a virtual camera viewpoint position in the virtual space 60, the virtual camera viewpoint position corresponding to the position and photographing direction of the photographing device 14 in the real space 50. For example, the virtual camera viewpoint position determined by the position determination unit 23 is represented by 6DoF (six degrees of freedom) in the virtual space 60. For example, a virtual camera image angle is determined in accordance with the actual angle of view of the photographing device 14.

In one example, the application unit 21 determines whether or not the number of feature point sets 4 photographed by the photographing device 14 is greater than or equal to a prescribed number, and in the case where it is determined that the number of the feature point sets 4 photographed by the photographing device 14 is greater than or equal to the prescribed number, the position determination unit 23 determines a virtual camera viewpoint position. For example, in the case where the application unit 21 determines that the recognition unit 22 has recognized three or more feature point sets 4, the position determination unit 23 determines a virtual camera viewpoint position.

The position determination unit 23 obtains arrangement position information related to the arrangement of the feature point sets 4 by using the IDs of the recognized feature point sets 4 and feature point set position data stored in the storage device 15. Furthermore, the position determination unit 23 determines relative position information indicating the positions of the mobile terminal device 2 relative to the recognized feature point sets 4 from the shapes and sizes of the feature point sets 4. To be more precise, the relative position information is relative position and posture information, an example of which is information including 6DoF as a relative position, and the relative position information includes the three-dimensional position and facing direction of the mobile terminal device 2 (photographing device 14) relative to the feature point sets 4. Thus, for example, the relative position information (relative position and posture information) is the position and posture information of the feature point sets 4 using a virtual camera position as the origin. The position determination unit 23 obtains arrangement position information for the recognized individual feature point sets 4 and determines relative position information indicating the position of the mobile terminal device 2 relative to the feature point sets 4. The position determination unit 23 determines a virtual camera viewpoint position (6DoF) on the basis of the obtained arrangement position information and the determined relative position information.

In one example, the position determination unit 23 individually calculates tentative virtual camera viewpoint positions (6DoF) by using the arrangement position information and relative position information of the recognized individual feature point sets 4. The position determination unit 23 determines a virtual camera viewpoint position by using the average value of the plurality of calculated 6DoF values. Alternatively, the position determination unit 23 determines the virtual camera viewpoint position by using the median value of the plurality of calculated 6DoF values. Alternatively, the position determination unit 23 determines the virtual camera viewpoint position by inputting the plurality of calculated 6DoF values to an estimation model such as a particle filter (NPL 4).

In one example, instead of or in addition to the above-described example, the position determination unit 23 determines a virtual camera viewpoint position by using arrangement relationships among known feature point sets 4. Here, since the individual feature point sets 4 are arranged away from each other by predefined distances in the vertical direction and the horizontal direction, it is possible to derive the positions of the other feature point sets 4 from the position of one feature point set 4. In one example, the position determination unit 23 determines relative position information for each of the recognized feature point sets 4, and then determines a first virtual rectangle constituted of the recognized feature point sets 4. Meanwhile, the position determination unit 23 obtains arrangement position information for each of the recognized feature point sets 4, and then determines a second virtual rectangle constituted of the obtained arrangement position information. The position determination unit 23 determines a virtual camera viewpoint position by using the arrangement position information of the second virtual rectangle and the shape and size of the first virtual rectangle with respect to the second virtual rectangle.

In another example, in the case where a tentative virtual camera viewpoint position is set as a 6DoF value calculated by using the arrangement position information and relative position information of one feature point set 4, the position determination unit 23 calculates the difference between the positions of the other feature point sets 4 derived from the one feature point set 4 and the positions of the other feature point sets 4 identified from an image photographed by the photographing device 14. The position determination unit 23 extracts, from among the calculated individual 6DoF values, 6DoF values the calculated difference of which is within a prescribed range, and determines a virtual camera viewpoint position by using the average value or median value of the 6DoF values or by inputting the 6DoF values to a known estimation model. Alternatively, the position determination unit 23 weights each of the calculated 6DoF values in accordance with the calculated difference, and determines the virtual camera viewpoint position by using the average value or median value of the weighted 6DoF values or inputting the 6DoF values to a known estimation model. Alternatively, the position determination unit 23 determines the virtual camera viewpoint position on the basis of the calculated 6DoF values, and then corrects the virtual camera viewpoint position by using the arrangement relationship of a known feature point set cloud 3.

In one example, the position determination unit 23 determines the position of the mobile terminal device 2 relative to feature point sets 4 as follows. The sizes and shapes of the individual feature point sets 4 are defined in advance. By using a known method, the position determination unit 23 recognizes the feature point sets 4 as images, recognizes the outlines of the feature point sets 4, and calculates a coordinate transformation matrix for performing transformation from a feature point set coordinate system to a camera coordinate system. By using the calculated coordinate transformation matrix, the position determination unit 23 calculates the positions and postures, in the camera coordinate system, of the feature point sets 4 in an image photographed by the photographing device 14, and determines the positions (6DoF) of the feature point sets 4 relative to the photographing device 14.

In one example, the position determination unit 23 determines the position of the mobile terminal device 2 relative to feature point sets 4 as follows. The position determination unit 23 uses a known method (NPLs 2 and 3) in which local features, which are robust features resistant to rotation and movement, are used to detect objects included in a captured image. In this example, the storage device 15 stores the template images of the individual feature point sets 4 in association with the IDs of the feature point sets 4. The position determination unit 23 determines a relative position (6DoF) by using local features to derive projections (such as rotation, enlargement/reduction, and deformation) between the template images and an image photographed by the photographing device 14. Here, the local features refer to patterns or conspicuous structures seen in an image, such as points, edges, or small image patches. Specifically, the projection is estimated by using four corner points of the template image and a homography matrix obtained by using the local features. The homography matrix refers to a parameter to be used when a plane is projected on another plane by using projection transformation.

Although a virtual camera viewpoint position is calculated and determined by using 6DoF, position information in other formats may also be used as long as equivalent information is included.

On the basis of data of the first virtual object 61 and data of the second virtual object 62 stored in the storage device 15, as well as the virtual camera viewpoint position determined by the position determination unit 23, the image generation unit 24 generates a mixed-reality image in which an image of the second virtual object 62 according to the viewpoint position is superimposed on a photographed image of the real space 50. The image display unit 25 displays an application screen including the generated mixed-reality image on the display device 13.

In one example, the image generation unit 24 reads data of the first virtual object 61 and data of the second virtual object 62 corresponding to the virtual camera viewpoint position determined by the position determination unit 23, and generates a mixed-reality image in which an image of the second virtual object 62 according to the viewpoint position is superimposed on a photographed image of the real space 50. When generating the mixed-reality image, a known method as indicated in NPL 1 or NPL 5 may be used.

Figure 8:
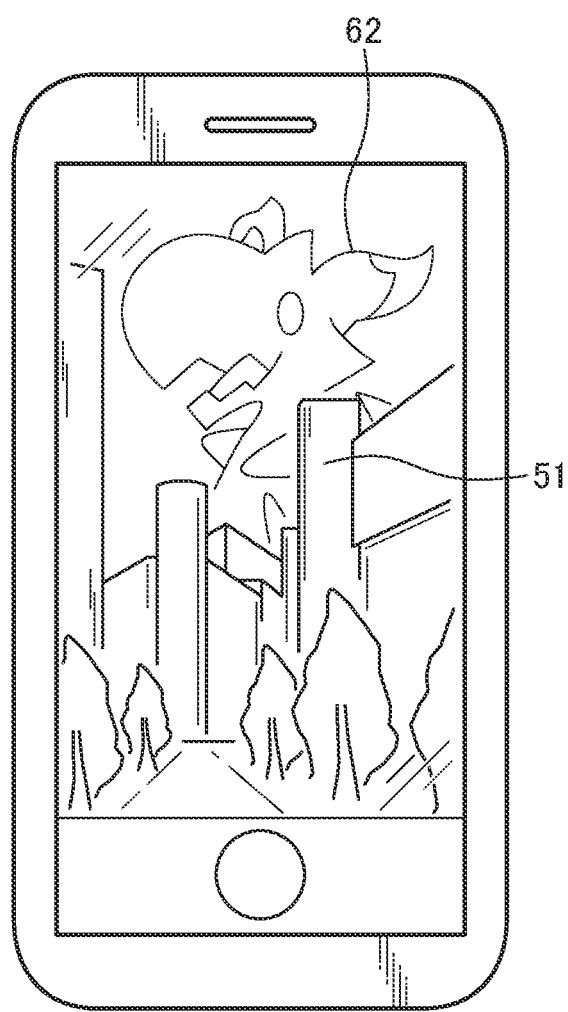
FIG. 8 is an example of a mixed-reality image in which the image of the second virtual object shown in FIG. 7 is superimposed on a photographed image of the real space.

FIG. 8 is an example of a mixed-reality image in which the image of the second virtual object 62 shown in FIG. 7 is superimposed on a photographed image of the real space 50. In the case where the first virtual object 61 and the second virtual object 62 overlap each other in the field-of-view range of a virtual camera, if the depth distance of the second virtual object 62 from the virtual camera viewpoint position is larger than that of the first virtual object 61, the image generation unit 24 generates a mixed-reality image in which the image of the second virtual object 62 without the overlapping parts is superimposed. For example, the image generation unit 24 performs rendering processing of the first virtual object 61 as an invisible mesh, and performs normal rendering processing for the second virtual object 62. By doing so, for the above-described overlapping parts, the invisible rendering processing for the first virtual object 61, which is closer to the virtual camera viewpoint position than the second virtual object 62 is, is performed. Note that the field-of-view range of the virtual camera is determined in accordance with the image angle of the photographing device 14.

FIG. 8 shows the second virtual object 62, part of which is not displayed. In FIG. 8, it can be seen that the second virtual object 62 is displayed such that the second virtual object 62 exists behind a building, which is the real object 51.

In one example, the image generation unit 24 generates an MR moving picture by generating a mixed-reality image at a prescribed frame rate. In one example, in the case where the photographing device 14 does not recognize feature point sets 4 or in the case where a virtual camera viewpoint position is not determined, the image display unit 25 directly displays a photographed image of the real space 50 as a mixed-reality image.

In this embodiment, due to the operations of the individual parts of the application unit 21, the MR system 1 needs to include at least three feature point sets 4 in a single photographed image photographed by the photographing device 14. The vertical direction distance and horizontal direction distance between two feature point sets 4, among the feature point sets 4 included in a feature point set cloud 3, corresponding to adjacent vertex positions of a virtual rectangle are determined on the basis of the image angle of the photographing device 14 when away from the feature point set cloud 3 by a predetermined distance.

Figure 9:
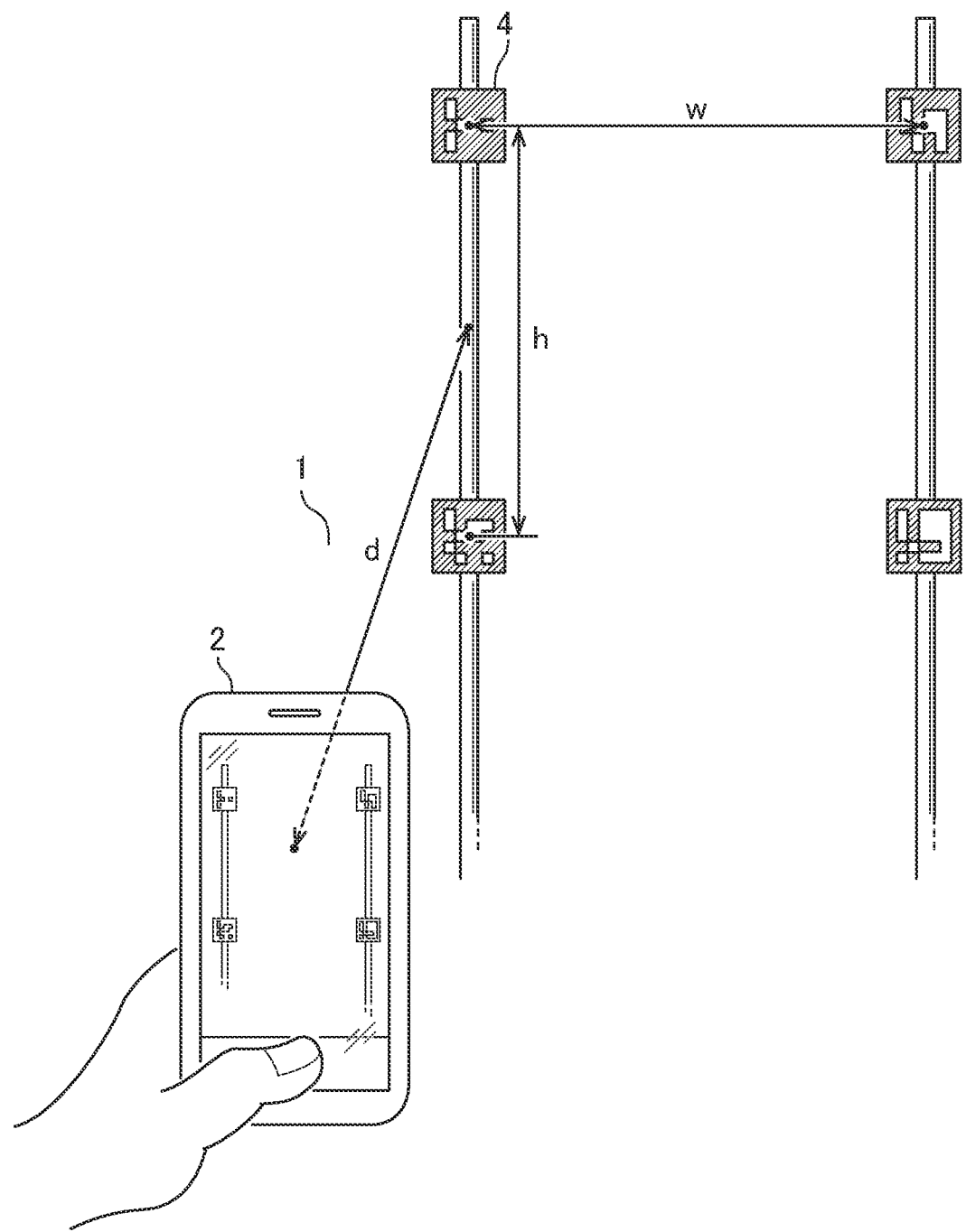
FIG. 9 is a diagram for explaining positional relationships among the mobile terminal device in the mixed reality system and feature point sets included in a feature point set cloud according to the embodiment of the present invention.

FIG. 9 is a diagram for explaining positional relationships among the mobile terminal device 2 in the MR system 1 and feature point sets 4 included in a feature point set cloud 3 according to the embodiment of the present invention. In FIG. 9, the distance h represents a distance between feature point sets 4 fixed to the rod-like body 41, and the distance w represents a distance between feature point sets 4 fixed to the upper sides of a pair of the rod-like bodies 41 or a distance between feature point sets 4 fixed to the lower sides of the rod-like bodies 41. The distance d represents a distance from the feature point set cloud 3 to the photographing device 14 (mobile terminal device 2). The distance between feature point sets 4 is, for example, a distance between the centers of the feature point sets 4, and the distance from the feature point set cloud 3 is, for example, a distance from a virtual rectangle (plane) constituted of the feature point sets 4 included in the feature point set cloud 3. For example, the distance d is a distance from a user to the feature point set cloud 3, which is recommended by the MR system 1 to the user who wishes to have an MR experience.

In one example, in the case where the vertical image angle of the photographing device 14 is a degrees and the horizontal image angle of the photographing device 14 is β degrees, the maximum value $h_{max}$ of the distance h and the maximum value $w_{max}$ of the distance w are determined by the following formulas, respectively.

$$h_{max} = d \cdot 2 \, \tan\frac{a}{2} \quad (1)$$

$$w_{max} = d \cdot 2 \, \tan\frac{\beta}{2}$$

By arranging the individual feature point sets 4 such that $h \leq h_{max}$ and $w \leq w_{max}$, when the photographing device 14 is away from the feature point set cloud 3 by the distance d, it becomes possible for the photographing device 14 to capture, in a single photographed image, the feature point sets 4 included in the feature point set cloud 3. In order for the position determination unit 23 to calculate a position more accurately, distances between the feature point sets 4 are preferably made larger, and thus, it is preferred to arrange the individual feature point sets 4 such that $h = h_{max}$ and $w = w_{max}$. In one example, in the case where d=2 m, α=63 degrees, and β=50 degrees, h=1.2 m and w=0.9 m.

Figure 10:
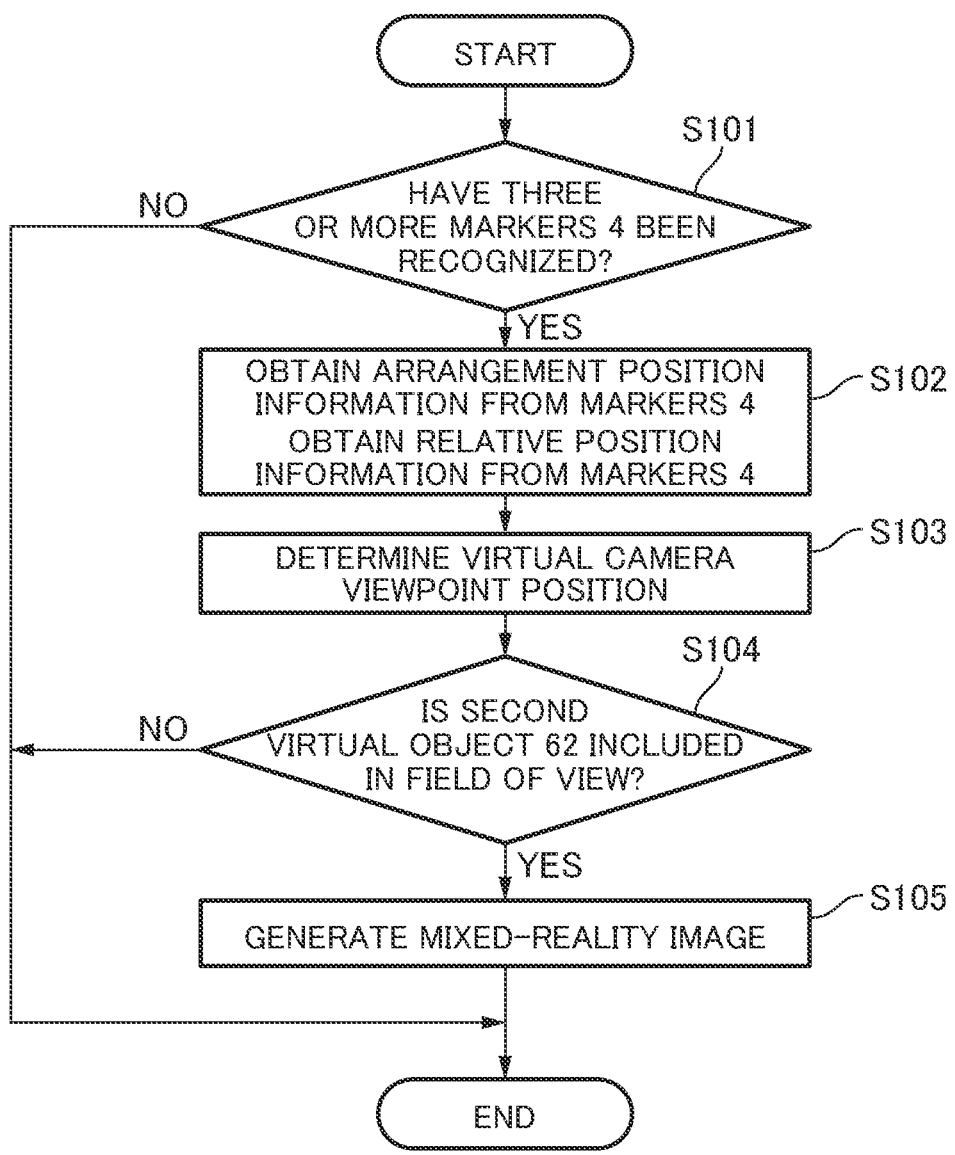
FIG. 10 is a flowchart showing information processing in the mixed reality system according to the embodiment of the present invention.

Next, information processing in the MR system 1 according to the embodiment of the present invention will be described by using the flowchart shown in FIG. 10. The information processing indicated in FIG. 10 is realized by causing the mobile terminal device 2 to execute a program. In this processing, a user having the mobile terminal device 2 is present in the real space 50, and an application including the function of the application unit 21 is started by the user. In one example, while the application is running, the mobile terminal device 2 regularly executes the processing in this flowchart.

In step 101, the mobile terminal device 2 determines whether or not it is possible to recognize three or more feature point sets 4 from a photographed image photographed by the photographing device 14 of the mobile terminal device 2. In the case where three or more feature point sets 4 are recognized, this processing proceeds to step 102, and in the case where less than three feature point sets 4 are recognized, this processing is terminated.

Next, in step 102, the mobile terminal device 2 obtains arrangement position information related to the arrangement of the individual feature point sets 4 by using the individual IDs of the recognized feature point sets 4 and feature point set position data stored in the storage device 15. The mobile terminal device 2 determines relative position information indicating the positions of the mobile terminal device 2 relative to the individual feature point sets 4 from the shapes and sizes of the recognized feature point sets 4.

Next, in step 103, the mobile terminal device 2 determines a virtual camera viewpoint position on the basis of each item of the arrangement position information and relative position information for the recognized individual feature point sets 4.

Next, in step 104, the mobile terminal device 2 determines whether or not the second virtual object 62 is present within a virtual camera field-of-view range. In the case where the second virtual object 62 is present, this processing proceeds to step 105, and in the case where the second virtual object 62 is not present, this processing is terminated. In step 105, on the basis of data of the first virtual object 61, data of the second virtual object 62, and the determined virtual camera viewpoint position, the mobile terminal device 2 generates a mixed-reality image in which an image of the second virtual object 62 according to the viewpoint position is superimposed on a photographed image of the real space 50. In the case where this processing is terminated, the mobile terminal device 2 directly displays the photographed image of the real space 50 as the mixed-reality image.

Next, the operation and advantages of the MR system 1 (mobile terminal device 2) according to the embodiment of the present invention will be described. In this embodiment, the MR system 1 includes a plurality of feature point sets 4 in the prescribed real space 50, and the individual feature point sets 4 are arranged at four vertex positions of a virtual rectangle in the real space 50 away from each other by a predefined distance in the vertical direction and a predefined distance in the horizontal direction. Furthermore, the storage device 15 stores three-dimensional space data representing the real object 51 present in the real space 50 and defining the virtual space 60, and stores arrangement position information of the individual feature point sets 4, the arrangement position information being associated with the three-dimensional space data.

By recognizing the feature point sets 4, the mobile terminal device 2 obtains the arrangement position information of the recognized individual feature point sets 4. Meanwhile, the mobile terminal device 2 determines relative position information (6DoF) indicating the positions of the mobile terminal device 2 relative to the individual feature point sets 4 from the shapes and sizes of the recognized individual feature point sets 4 in a photographed image. The mobile terminal device 2 determines a camera viewpoint position (6DoF) on the basis of the arrangement position information and relative position information of the recognized individual feature point sets 4, and generates a mixed-reality image with respect to the photographed image of the real space 50 according to the virtual camera viewpoint position.

As described above, in the MR system 1, the position of the real object 51 is associated with the positions of the feature point sets 4 by using the coordinates of the three-dimensional space data (virtual space 60), and thus, by recognizing the feature point sets 4, it is possible for the mobile terminal device 2 to obtain the arrangement position information of the recognized feature point sets 4 in the virtual space 60. Furthermore, in this embodiment, by using the arrangement position information and the relative position information of the mobile terminal device 2 with respect to the feature point sets 4, it is possible to determine a virtual camera viewpoint position (6DoF) corresponding to the photographing device 14 (self position) being operated by a user.

Furthermore, in this embodiment, after calculating individual tentative virtual camera viewpoint positions (6DoF) from the individual feature point sets 4, the mobile terminal device 2 determines a virtual camera viewpoint position on the basis of the calculated individual 6DoF values. The accuracy of the virtual camera viewpoint position is very important in generating a mixed-reality image. By using such a configuration, in this embodiment, it becomes possible to determine the virtual camera viewpoint position more accurately. Furthermore, in this embodiment, the mobile terminal device 2 determines the virtual camera viewpoint position by further using the arrangement relationship of a known feature point set cloud 3. By doing so, it becomes possible to determine the virtual camera viewpoint position more accurately. In this case, when the mobile terminal device 2 determines the virtual camera viewpoint position, in order to execute operations more accurately and quickly, it is preferred that the adjacent feature point sets 4 constituting the feature point set cloud 3 be substantially parallel in the perpendicular direction (vertical direction) and the horizontal direction.

Furthermore, in this embodiment, when generating a mixed-reality image, the mobile terminal device 2 performs rendering processing as an invisible mesh for the first virtual object 61, and performs normal rendering processing for the second virtual object 62. By using such a configuration, in this embodiment, it becomes possible to realize higher geometric consistency (front/rear relationship, occlusion, etc.) with the real object 51 when displaying the second virtual object 62. The geometric consistency in the mixed-reality image is extremely important when reality is applied to the second virtual object 62.

The above-described operation and advantages similarly apply to other embodiments or other examples unless explicitly mentioned otherwise.

The present invention, in another embodiment thereof, may also be a program for realizing the functions or information processing shown in the flowchart of the above-described embodiment of the present invention, or a computer-readable storage medium storing the program. The present invention, in yet another embodiment thereof, may also be a method that realizes the functions or information processing shown in the flowchart of the above-described embodiment of the present invention. The present invention, in yet another embodiment thereof, may also be a server that can provide a computer with a program for realizing the functions or information processing shown in the flowchart of the above-described embodiment of the present invention. The present invention, in yet another embodiment thereof, may also be a virtual machine that realizes the functions or information processing shown in the flowchart of the above-described embodiment of the present invention. The present invention, in yet another embodiment thereof, may also be an arrangement structure of feature point sets 4 in the MR system 1.

Modifications of the embodiment of the present invention will be described below. The modifications that will be described below may be combined, as appropriate, and applied to an arbitrary embodiment as long as no inconsistency arises.

In one modification, feature point sets 4 are two-dimensional codes or include two-dimensional codes. For example, the feature point sets 4 are QR codes (registered trademark) or data matrices. In yet another modification, two-dimensional codes serving as the feature point sets 4 include, as identifiable information, identifiers indicating a latitude, a longitude, an angle, etc. In this case, it is possible for the mobile terminal device 2 that has recognized the two-dimensional codes to obtain arrangement position information of the feature point sets 4 directly from the obtained identifiable information. In this case, the storage device 15 need not store feature point set position data.

In one modification, the feature point sets 4 are known AR markers.

In one modification, posters, paintings, pictures, etc. having spatial distribution of different feature points that are individually identifiable are used as the feature point sets 4. The recognition unit 22 and the position determination unit 23 use the above-described known method (NPLs 2 and 3) using local features. In this case, the local features serve as the identifiable information. In this modification, the storage device 15 stores the template images of the individual feature point sets 4 in association with the IDs of the feature point sets 4. The recognition unit 22 recognizes the IDs of the individual feature point sets 4 by extracting the local features from the feature point sets 4 photographed by the photographing device 14 and comparing the local features with the template images of the individual feature point sets 4. The position determination unit 23 obtains arrangement position information related to the arrangement of the feature point sets 4 by using the IDs of the recognized feature point sets 4 and feature point set position data stored in the storage device 15. Furthermore, the position determination unit 23 determines relative position information of the mobile terminal device 2 with respect to the feature point sets 4 by using local features to derive projections (such as rotation, enlargement/reduction, and deformation) between the template images and images photographed by the photographing device 14. For each of the recognized feature point sets 4, the position determination unit 23 obtains the arrangement position information and determines the relative position information, and determines a virtual camera viewpoint position on the basis of the arrangement position information and the relative position information.

In one modification, a feature point set cloud 3 includes three feature point sets 4 arranged to have predefined positional relationships. For example, two of the feature point sets 4 are securely attached to one rod-like body 41 of a pair of rod-like bodies 41 installed in the real space 50 in a horizontally-isolated manner, and one of the feature point sets 4 is securely attached to the other rod-like body 41. In this embodiment, by including the three feature point sets 4 having predefined positional relationships in the feature point set cloud 3, it becomes possible for the position determination unit 23 to determine a virtual camera viewpoint position by using the arrangement relationship of the known feature point set cloud 3. In this case, the three feature point sets 4 are preferably arranged to have positional relationships corresponding to the positions of three vertices among four vertices of a virtual rectangle in the real space 50.

In one modification, the MR system 1 includes a plurality of feature point sets 4 each of which is securely attached to each of three or more rod-like bodies 41 installed in the real space 50 in a horizontally-isolated manner. To each of the rod-like bodies 41, a plurality of the feature point sets 4 are securely attached in a vertically-isolated manner. However, only one of the feature point sets 4 may be attached to some of the rod-like bodies 41.

Figure 11:
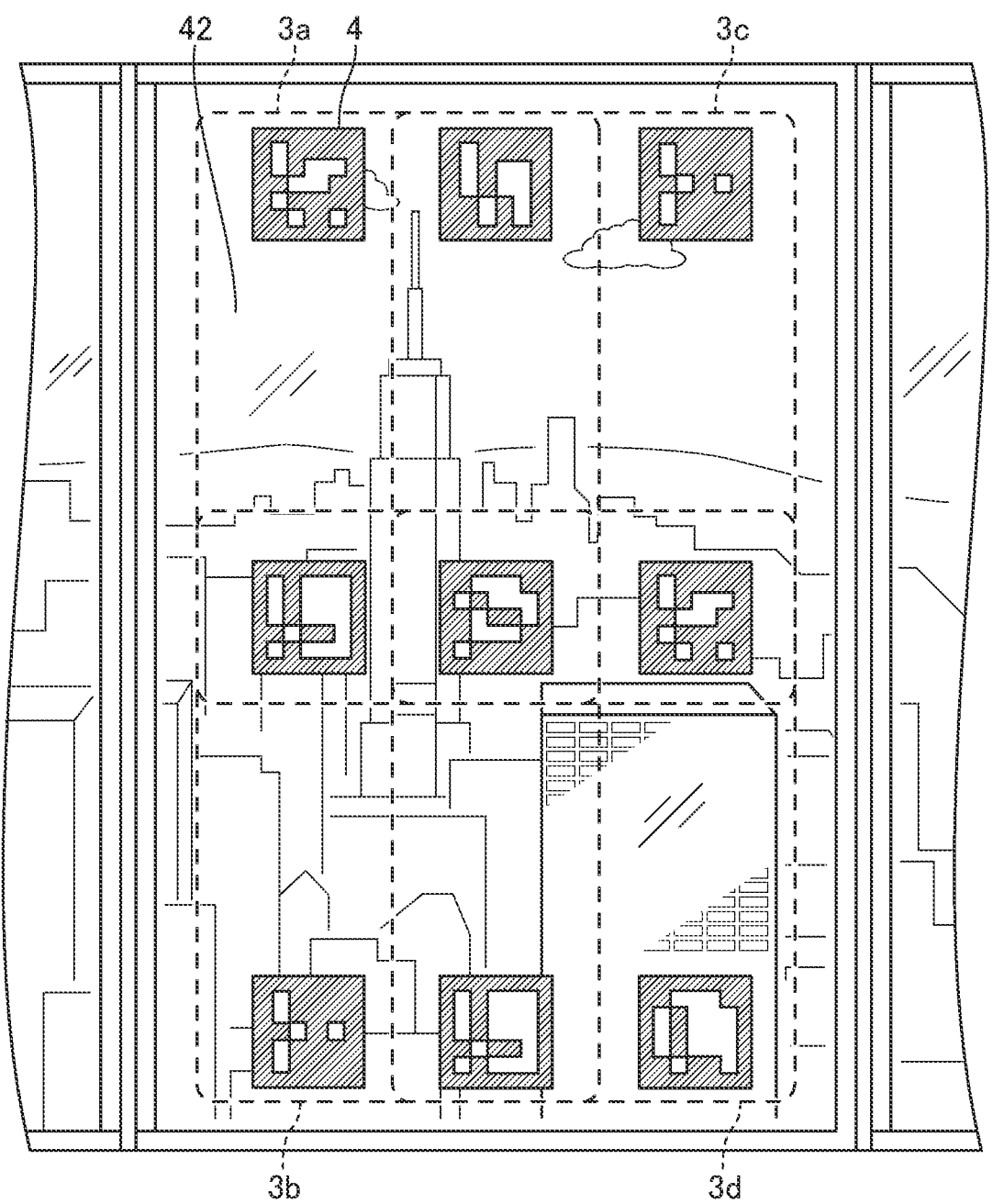
FIG. 11 is a diagram showing a feature point set cloud 3 securely attached to a window glass.

In one modification, each of the feature point sets 4 is securely attached to a transmission member 42 formed of a light transmitting material. The transmission member 42 is, for example, a glass or resin that transmits almost the entire range of visible light and may be part of a structure such as window glass or may be portable, such as a glass plate. FIG. 11 is a diagram showing a feature point set cloud 3 securely attached to window glass.

In one modification, each of the feature point sets 4 is securely attached by using a wire. However, the feature point sets 4 may be fixed in the real space 50 by using members having functions equivalent to wires.

In one modification, the MR system 1 includes a feature point set cloud 3 including five or more feature point sets 4. For example, the feature point set cloud 3 is constituted of twenty feature point sets 4. This modification assumes the case where the photographing device 14 cannot capture, in a single photographed image, all of the feature point sets 4 included in the feature point set cloud 3.

The recognition unit 22 recognizes, at prescribed time intervals, the individual feature point sets 4 included in an image photographed by the photographing device 14. The position determination unit 23 determines, at prescribed time intervals, a camera viewpoint position (6DoF) on the basis of the arrangement position information and relative position information of the recognized individual feature point sets 4. On the basis of data of the first virtual object 61 and data of the second virtual object 62, as well as the virtual camera viewpoint position determined by the position determination unit 23 at prescribed time intervals, the image generation unit 24 generates a mixed-reality image with respect to the photographed image of the real space 50 according to the virtual camera viewpoint position.

As described above, after the photographing device 14 recognizes the plurality of feature point sets 4, when the photographing position of the photographing device 14 is moved by the movement of a user, the mobile terminal device 2 recognizes a plurality of other feature point sets 4. By using such a configuration, it becomes possible for the mobile terminal device 2 to perform "roaming processing" in which calibration is performed while sequentially switching among a plurality of feature point sets 4 as the user moves in the real space 50. Thus, in this modification, it is possible for the mobile terminal device 2 to consecutively calculate a self position (6DoF) even in the case where a plurality of feature point sets 4 photographed by the photographing device 14 change in accordance with time. This makes it possible to continuously provide the user moving in the real space 50 with an MR experience.

In this modification, the position determination unit 23 may determine a camera viewpoint position (6DoF) on the basis of the arrangement position information and relative position information for each of some feature point sets 4 of the recognized feature point sets 4. For example, the camera viewpoint position (6DoF) may be determined on the basis of the arrangement position information and relative position information for each of the feature point sets 4, in a photographed image, having a size larger than or equal to a prescribed size.

In one modification, as shown in FIG. 11, the MR system 1 includes a plurality of feature point set clouds 3 including a first feature point set cloud 3a, a second feature point set cloud 3b, a third feature point set cloud 3c, and a fourth feature point set cloud 3d. In this modification, although the individual feature point set clouds 3 include mutually different feature point sets 4, a plurality of the feature point set clouds 3 include the same feature point sets 4. For example, the first feature point set cloud 3a includes feature point sets 4 included in the second feature point set cloud 3b and feature point sets 4 not included in the second feature point set cloud 3b.

The recognition unit 22 recognizes, at prescribed time intervals, the individual feature point sets 4 included in an image photographed by the photographing device 14. The application unit 21 selects one feature point set cloud 3 of the recognized feature point set clouds 3 as a reference feature point set cloud 3. The position determination unit 23 determines relative position information for each of the recognized feature point sets 4 included in the reference feature point set cloud 3, and then determines a first virtual rectangle constituted of the recognized feature point sets 4.

Meanwhile, the position determination unit 23 obtains arrangement position information for each of the recognized feature point sets 4, and then determines a second virtual rectangle constituted of the obtained arrangement position information. The position determination unit 23 determines a virtual camera viewpoint position by using the arrangement position information of the second virtual rectangle and the shape and size of the first virtual rectangle with respect to the second virtual rectangle.

In one example, each time the recognition unit 22 recognizes each feature point set 4, the application unit 21 selects a reference feature point set cloud 3. In one example, the application unit 21 selects, as the reference feature point set cloud 3, a feature point set cloud 3 having more feature point sets 4 included in a photographed image. In one example, instead of or in addition to the above-described selection method, the application unit 21 selects, as the reference feature point set cloud 3, a feature point set cloud 3 having more feature point sets 4 included in the center part of the photographed image. In one example, instead of or in addition to the above-described selection method, the application unit 21 selects, as the reference feature point set cloud 3, a feature point set cloud 3 having a higher ratio of large-sized feature point sets 4 included in the photographed image.

In this way, after the photographing device 14 recognizes feature point sets 4 included in the reference feature point set cloud 3, when the photographing position of the photographing device 14 is moved by the movement of a user, the mobile terminal device 2 recognizes feature point sets 4 included in another reference feature point set cloud 3. By using such a configuration, it becomes possible for the mobile terminal device 2 to perform "roaming processing" in which calibration is performed while sequentially switching a feature point set cloud 3 as the user moves in the real space 50. Thus, in this modification, it is possible for the mobile terminal device 2 to consecutively calculate a self position (6DoF) even in the case where a plurality of feature point sets 4 photographed by the photographing device 14 change with time. This makes it possible to continuously provide the user moving in the real space 50 with an MR experience.

Note that one feature point set cloud 3 may include six feature point sets 4 or may include nine feature point sets 4.

In one modification, the mobile terminal device 2 (position determination unit 23) fixes a virtual camera viewpoint position to a prescribed position (for example, predefined 6DoF) in the virtual space 60 and dynamically determines the position of the coordinates of three-dimensional space data. The mobile terminal device 2 determines three-dimensional position information of the first virtual object 61 instead of determining a camera viewpoint position. For example, the mobile terminal device 2 determines the coordinates of the three-dimensional space data. Accordingly, the coordinates of the feature point sets 4 and the coordinates of the second virtual object 62 are changed.

In one modification, arrangement position information (arrangement position and posture information) or relative position information (relative position and posture information) uses a quaternion value instead of a 6DoF value.

Figure 12:
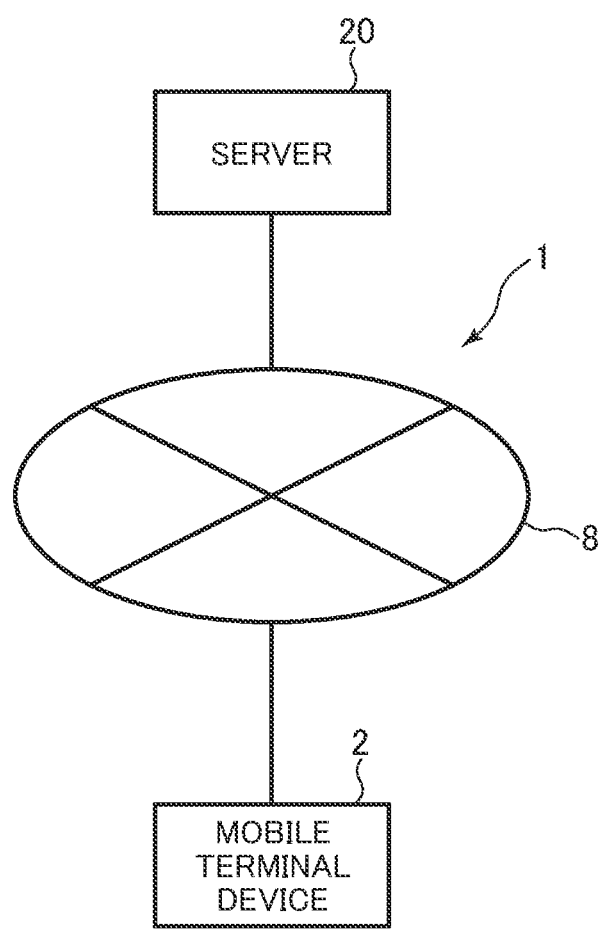
FIG. 12 shows an example of the overall configuration of the mixed reality system according to the embodiment of the present invention.

In one modification, as shown in FIG. 12, the MR system 1 is provided with a plurality of mobile terminal devices 2 and a server 6, and the mobile terminal devices 2 and the server 6 are connected to a network 8 such as the Internet and are able to carry out communication with each other. The server 6 is provided with a configuration provided in an ordinary server. For example, the server 6 is provided with a processor, such as a CPU, that controls individual components, a storage element such as a ROM or a RAM, a storage device such as a hard disk drive, a display device such as a display, an input device such as a mouse, a keyboard, or a touchscreen, and a communication device such as a network board. These constituent elements are connected via a bus.

The storage device provided in the server 6 stores data of the first virtual object 61 (three-dimensional space data) and data of the second virtual object 62. The storage device 15 of the mobile terminal device 2 need not store the data stored in the server 6. For example, the server 6 stores three-dimensional space data with a program for causing the three-dimensional space data to function as a three-dimensional space database, and transmits the three-dimensional space data to the mobile terminal device 2 in response to a query from the mobile terminal device 2. The storage device provided in the server 6 may store feature point set position data on behalf of the storage device 15 of the mobile terminal device 2.

In yet another modification, the operations of the mobile terminal device 2 of the MR system 1 are realized by a Web application provided by the server 6. For example, the server 6 is provided with all of the functions of the application unit 21, and stores various kinds of data used in the operation of the application unit 21. In this case, the server 6 provides the mobile terminal device 2 with a Web application corresponding to the application unit 21. When the Web application installed in the mobile terminal device 2 is started, the mobile terminal device 2 accesses the Web application on the server 6. The mobile terminal device 2 realizes the functions of the application unit 21 on the mobile terminal device 2 by communicating with the server 6.

In the processing or operation described above, the processing and operation may be modified freely unless any inconsistency arises in the processing or operation, such as an inconsistency that a step involves the use of data that could not yet be available in that step. Furthermore, the embodiments described above are examples for explaining the present invention, and the present invention is not limited to these embodiments. The present invention can be embodied in various forms not departing from the gist thereof.

REFERENCE SIGNS LIST

1 Mixed reality system
2 Mobile terminal device
3 Feature point set cloud
4 Feature point set
6 Server
8 Network
11 Processor
12 Input device
13 Display device
14 Photographing device
15 Storage device
16 Communication device
17 Bus
21 Application unit
22 Recognition unit
23 Position determination unit
24 Image generation unit
25 Image display unit
41 Rod-like body
42 Transmission member
50 Real space 51 Real object
60 Virtual space
61 First virtual object
62 Second virtual object

What is claimed is:

1. A mixed reality system for displaying, on a display for displaying a first virtual object to a user present in a prescribed real space, a mixed-reality image in which an image of the first virtual object arranged in a virtual space corresponding to the prescribed real space is superimposed on a photographed image of the prescribed real space, the mixed reality system comprising a mobile terminal device having the display and a photographing device that photographs the prescribed real space, wherein:

the mixed reality system includes a plurality of feature point sets arranged in the prescribed real space, the plurality of feature point sets including identifiable information that allows identification of each of the plurality of feature point sets, and at least three feature point sets among the plurality of feature point sets being arranged so as to have predefined positional relationships; and the mobile terminal device is configured to:

store data, obtained in advance, of the first virtual object that corresponds to a real object present in the prescribed real space and that defines the virtual space, and data of a second virtual object, in the virtual space, that does not correspond to the real object, store arrangement position and posture information in the virtual space for each of the plurality of feature point sets arranged in the prescribed real space, recognize each of the plurality of feature point sets photographed by the photographing device, determine a plurality of projections using a homography matrix, a template image of a feature point set among the plurality of feature point sets, and a plurality of local features in the photographed image, wherein the plurality of projections are selected from a group consisting of one or more rotation projections, one or more enlargement projections, one or more reduction projections, and one or more deformation projections, determine a relative position of the mobile terminal device using the plurality of projections.

determine a viewpoint position of a virtual camera, in the virtual space, corresponding to a position and a photographing direction of the photographing device in the prescribed real space, based on the arrangement position and posture information for each of the plurality of feature point sets, the arrangement position and posture information being obtained from the identifiable information of some or all of the recognized feature point sets, and the relative position and posture information of the mobile terminal device with respect to each of the plurality of feature point sets, the relative position and posture information being determined from shapes and sizes of the plurality of feature point sets, and determine a first depth distance between the viewpoint position of the virtual camera and the first virtual object using the plurality of feature point sets, determine a second depth distance between the viewpoint position of the virtual camera and the second virtual object using the plurality of feature point sets, determine whether the first virtual object is closer to the viewpoint position than the second virtual object based on the first depth distance and the second depth distance, generate, in response to determining that the second virtual object is closer than the first virtual object and based on the first depth distance of the first virtual object, the second depth distance of the second virtual object, and the viewpoint position, a mixed-reality image in which an image of the second virtual object according to the viewpoint position is superimposed on the photographed image of the prescribed real space, wherein a first portion of the second virtual object is superimposed on the first virtual object in the mixed-reality image in response to determining that the second virtual object is closer to the viewpoint position than the first virtual object, wherein a second portion of the first virtual object is not displayed in the mixed-reality image based on the first depth distance of the second portion of the first virtual object being located behind the real object in the prescribed real space, wherein the plurality of feature point sets comprise five or more of feature point sets that are AR markers, and wherein the mobile terminal device, at prescribed time intervals, recognizes each of the five or more feature point sets taken by the photographing device to determine the viewpoint position for generating the mixed-reality image.

2. A mixed reality system according to claim 1, wherein, in response to the first virtual object and the second virtual object overlapping each other in a field-of-view range of the virtual camera when the mixed-reality image is generated, if a second depth distance of the second virtual object from the viewpoint position is larger than that of the first virtual object, the mobile terminal device generates a mixed-reality image in which the image of the second virtual object with overlapping parts removed is superimposed.

3. A mixed reality system according to claim 1, wherein the mixed reality system includes four of the plurality of feature point sets arranged in the prescribed real space, and individual feature point sets among the plurality of feature point sets have positional relationships corresponding to four vertex positions of a virtual rectangle in the prescribed real space and are arranged away from each other by a predefined distance in a vertical direction and a predefined distance in a horizontal direction.

4. A mixed reality system according to claim 3, wherein at least one of the plurality of feature point sets are securely attached to each of a plurality of rod-like bodies installed in a horizontally-isolated manner.

5. A mixed reality system according to claim 1, wherein each of the plurality of feature point sets is securely attached to a transmission member formed of a light transmitting material.

6. A mixed reality system according to claim 1, wherein each of the plurality of feature point sets is securely attached by using a wire.

7. A non-transitory computer readable medium storing a program executed by a mobile terminal device in a mixed reality system for displaying, on a display for displaying a first virtual object to a user present in a prescribed real space, a mixed-reality image in which an image of the first virtual object arranged in a virtual space corresponding to the prescribed real space is superimposed on a photographed image of the prescribed real space, the mixed reality system comprising the mobile terminal device having the display and a photographing device that photographs the prescribed real space, wherein:

the mixed reality system includes a plurality of feature point sets arranged in the prescribed real space, the plurality of feature point sets including identifiable information that allows identification of each of the plurality of feature point sets, and at least three feature point sets among the plurality of feature point sets being arranged so as to have predefined positional relationships; and the program causes the mobile terminal device to execute:

a step of recognizing each of the plurality of feature point sets photographed by the photographing device, a step of determining a plurality of projections using a homography matrix, a template image of a feature point set among the plurality of feature point sets, and a plurality of local features in the photographed image, wherein the plurality of projections are selected from a group consisting of one or more rotation projections, one or more enlargement projections, one or more reduction projections, and one or more deformation projections, a step of determining a relative position of the mobile terminal device using the plurality of projections, a step of determining a viewpoint position of a virtual camera, in the virtual space, corresponding to a position and a photographing direction of the photographing device in the prescribed real space, based on arrangement position and posture information in the virtual space in which each of the plurality of feature point sets is arranged, the arrangement position and posture information being obtained from the identifiable information of some or all of the recognized feature point sets, and relative position and posture information of the mobile terminal device with respect to each of the plurality of feature point sets, the relative position and posture information being determined from shapes and sizes of the plurality of feature point sets, a step of determining a first depth distance between the viewpoint position of the virtual camera and the first virtual object using the plurality of feature point sets, a step of determining a second depth distance between the viewpoint position of the virtual camera and a second virtual object using the plurality of feature point sets, a step of determining whether the first virtual object is closer to the viewpoint position than the second virtual object based on the first depth distance and the second depth distance, and a step of generating, in response to determining that the second virtual object is closer than the first virtual object and based on the first depth distance of the first virtual object, the second depth distance of the second virtual object, and the viewpoint position, a mixed-reality image in which an image of the second virtual object according to the viewpoint position is superimposed on the photographed image of the prescribed real space, based on data, obtained in advance, of a first virtual object that corresponds to a real object present in the prescribed real space and that defines the virtual space, data of the second virtual object, in the virtual space, that does not correspond to the real object, and the viewpoint position, wherein a first portion of the second virtual object is superimposed on the first virtual object in the mixed-reality image in response to determining that the second virtual object is closer to the viewpoint position than the first virtual object, wherein a second portion of the first virtual object is not displayed in the mixed-reality image based on the first depth distance of the second portion of the first virtual object being located behind the real object in the prescribed real space, wherein the plurality of feature point sets comprise five or more of feature point sets that are AR markers, and wherein the mobile terminal device, at prescribed time intervals, recognizes each of the five or more feature point sets taken by the photographing device to determine the viewpoint position for generating the mixed-reality image.

8. A mobile terminal device in a mixed reality system for displaying, on a display for displaying a first virtual object to a user present in a prescribed real space, a mixed-reality image in which an image of the first virtual object arranged in a virtual space corresponding to the prescribed real space is superimposed on a photographed image of the prescribed real space, the mixed reality system comprising the mobile terminal device having the display and a photographing device that photographs the prescribed real space, wherein:

the mixed reality system includes a plurality of feature point sets arranged in the prescribed real space, the plurality of feature point sets including identifiable information that allows identification of each of the plurality of feature point sets, and at least three feature point sets among the plurality of feature point sets being arranged so as to have predefined positional relationships; and the mobile terminal device is configured to:

store data, obtained in advance, of the first virtual object that corresponds to a real object present in the prescribed real space and that defines the virtual space, and data of a second virtual object, in the virtual space, that does not correspond to the real object, store arrangement position and posture information in the virtual space for each of the plurality of feature point sets arranged in the prescribed real space, recognize each of the plurality of feature point sets photographed by the photographing device, determine a plurality of projections using a homography matrix, a template image of a feature point set among the plurality of feature point sets, and a plurality of local features in the photographed image, wherein the plurality of projections are selected from a group consisting of one or more rotation projections, one or more enlargement projections, one or more reduction projections, and one or more deformation projections, determine a relative position of the mobile terminal device using the plurality of projections, determine a viewpoint position of a virtual camera, in the virtual space, corresponding to a position and a photographing direction of the photographing device in the prescribed real space, based on the arrangement position and posture information for each of the plurality of feature point sets, the arrangement position and posture information being obtained from the identifiable information of some or all of the recognized feature point sets, and the relative position and posture information of the mobile terminal device with respect to each of the plurality of feature point sets, the relative position and posture information being determined from shapes and sizes of the plurality of feature point sets, determine a first depth distance between the viewpoint position of the virtual camera and the first virtual object using the plurality of feature point sets, determine a second depth distance between the viewpoint position of the virtual camera and the second virtual object using the plurality of feature point sets, determine whether the first virtual object is closer to the viewpoint position than the second virtual object based on the first depth distance and the second depth distance, and generate, in response to determining that the second virtual object is closer than the first virtual object and based on the first depth distance of the first virtual object, the second depth distance of the second virtual object, and the viewpoint position, a mixed-reality image in which an image of the second virtual object according to the viewpoint position is superimposed on the photographed image of the prescribed real space, wherein a first portion of the second virtual object is superimposed on the first virtual object in the mixed-reality image in response to determining that the second virtual object is closer to the viewpoint position than the first virtual object, wherein a second portion of the first virtual object is not displayed in the mixed-reality image based on the depth distance of the second portion of the first virtual object being located behind the real object in the prescribed real space, wherein the plurality of feature point sets comprise five or more of feature point sets that are AR markers, and wherein the mobile terminal device, at prescribed time intervals, recognizes each of the five or more feature point sets taken by the photographing device to determine the viewpoint position for generating the mixed-reality image.

9. A method executed by a mobile terminal device in a mixed reality system for displaying, on a display for displaying a first virtual object to a user present in a prescribed real space, a mixed-reality image in which an image of the first virtual object arranged in a virtual space corresponding to the prescribed real space is superimposed on a photographed image of the prescribed real space, the mixed reality system comprising the mobile terminal device having the display and a photographing device that photographs the prescribed real space, wherein:

the mixed reality system includes a plurality of feature point sets arranged in the prescribed real space, the plurality of feature point sets including identifiable information that allows identification of each of the plurality of feature point sets, and at least three feature point sets among the plurality of feature point sets being arranged so as to have predefined positional relationships; and the method comprises:

a step of recognizing each of the plurality of feature point sets photographed by the photographing device, a step of determining a plurality of projections using a homography matrix, a template image of a feature point set among the plurality of feature point sets, and a plurality of local features in the photographed image, wherein the plurality of projections are selected from a group consisting of one or more rotation projections, one or more enlargement projections, one or more reduction projections, and one or more deformation projections, a step of determining a relative position of the mobile terminal device using the plurality of projections, a step of determining a viewpoint position of a virtual camera, in the virtual space, corresponding to a position and a photographing direction of the photographing device in the prescribed real space, based on arrangement position and posture information in the virtual space in which each of the plurality of feature point sets is arranged, the arrangement position and posture information being obtained from the identifiable information of some or all of the recognized feature point sets, and the relative position and posture information of the mobile terminal device with respect to each of the plurality of feature point sets, the relative position and posture information being determined from shapes and sizes of the plurality of feature point sets, a step of determining a depth distance between the viewpoint position of the virtual camera and the first virtual object using the plurality of feature point sets, a step of determining a second depth distance between the viewpoint position of the virtual camera and a second virtual object using the plurality of feature point sets, a step of determining whether the first virtual object is closer to the viewpoint position than the second virtual object based on the first depth distance and the second depth distance, and a step of generating, in response to determining that the second virtual object is closer than the first virtual object and based on the first depth distance of the first virtual object, the second depth distance of the second virtual object, and the viewpoint position, a mixed-reality image in which an image of the second virtual object according to the viewpoint position is superimposed on the photographed image of the prescribed real space, based on data, obtained in advance, of the first virtual object that corresponds to a real object present in the prescribed real space and that defines the virtual space, data of the second virtual object, in the virtual space, that does not correspond to the real object, and the viewpoint position, wherein a first portion of the second virtual object is superimposed on the first virtual object in the mixed-reality image in response to determining that the second virtual object is closer to the viewpoint position than the first virtual object, wherein a second portion of the first virtual object is not displayed in the mixed-reality image based on the first depth distance of the second portion of the first virtual object being located behind the real object in the prescribed real space, wherein the plurality of feature point sets comprise five or more of feature point sets that are AR markers, and wherein the mobile terminal device, at prescribed time intervals, recognizes each of the five or more feature point sets taken by the photographing device to determine the viewpoint position for generating the mixed-reality image.

10. A mixed reality system for displaying, on a display for displaying a first virtual object to a user present in a prescribed real space, a mixed-reality image in which an image of the first virtual object arranged in a virtual space corresponding to the prescribed real space is superimposed on a photographed image of the prescribed real space, the mixed reality system comprising a server and a mobile terminal device having the display and a photographing device that photographs the prescribed real space, wherein:

the mixed reality system includes a plurality of feature point sets arranged in the prescribed real space, the plurality of feature point sets including identifiable information that allows identification of each of the plurality of feature point sets, and at least three feature point sets among the plurality of feature point sets being arranged so as to have predefined positional relationships;

the server is configured to:

store data, obtained in advance, of the first virtual object that corresponds to a real object present in the prescribed real space and that defines the virtual space, and data of a second virtual object, in the virtual space, that does not correspond to the real object, store arrangement position and posture information in the virtual space for each of the plurality of feature point sets arranged in the prescribed real space; and the mobile terminal device is configured to:

recognize each of the plurality of feature point sets photographed by the photographing device, determine a plurality of projections using a homography matrix, a template image of a feature point set among the plurality of feature point sets, and a plurality of local features in the photographed image, wherein the plurality of projections are selected from a group consisting of one or more rotation projections, one or more enlargement projections, one or more reduction projections, and one or more deformation projections, determine a relative position of the mobile terminal device using the plurality of projections, determine a viewpoint position of a virtual camera, in the virtual space, corresponding to a position and a photographing direction of the photographing device in the prescribed real space, based on the arrangement position and posture information for each of the plurality of feature point sets, the arrangement position and posture information being obtained from the identifiable information of some or all of the recognized feature point sets, and the relative position and posture information of the mobile terminal device with respect to each of the plurality of feature point sets, the relative position and posture information being determined from shapes and sizes of the plurality of feature point sets, determine a first depth distance between the viewpoint position of the virtual camera and the first virtual object using the plurality of feature point sets, determine a second depth distance between the viewpoint position of the virtual camera and the second virtual object using the plurality of feature point sets, determine whether the first virtual object is closer to the viewpoint position than the second virtual object based on the first depth distance and the second depth distance, and generate, in response to determining that the second virtual object is closer than the first virtual object and based on the first depth distance of the first virtual object, the second depth distance of the second virtual object, and the viewpoint position, a mixed-reality image in which an image of the second virtual object according to the viewpoint position is superimposed on the photographed image of the prescribed real space, wherein a first portion of the second virtual object is superimposed on the first virtual object in the mixed-reality image in response to determining that the second virtual object is closer to the viewpoint position than the first virtual object, wherein a second portion of the first virtual object is not displayed in the mixed-reality image based on the first depth distance of the second portion of the first virtual object being located behind the real object in the prescribed real space, wherein the plurality of feature point sets comprise five or more of feature point sets that are AR markers, and wherein the mobile terminal device, at prescribed time intervals, recognizes each of the five or more feature point sets taken by the photographing device to determine the viewpoint position for generating the mixed-reality image.

11. A mixed reality system for displaying, on a display for displaying a first virtual object to a user present in a prescribed real space, a mixed-reality image in which an image of the first virtual object arranged in a virtual space corresponding to the prescribed real space is superimposed on a photographed image of the prescribed real space, the mixed reality system comprising a mobile terminal device having the display and a photographing device that photographs the prescribed real space, wherein:

the mixed reality system includes a plurality of feature point sets arranged in the prescribed real space, the plurality of feature point sets including identifiable information that allows identification of each of the plurality of feature point sets, and at least three feature point sets among the plurality of feature point sets being arranged so as to have predefined positional relationships; and the mobile terminal device stores data, obtained in advance, of the first virtual object that corresponds to a real object present in the prescribed real space and that defines the virtual space, and data of a second virtual object, in the virtual space, that does not correspond to the real object, stores arrangement position and posture information in the virtual space for each of the plurality of feature point sets arranged in the prescribed real space, recognizes each of the plurality of feature point sets photographed by the photographing device, determines a plurality of projections using a homography matrix, a template image of a feature point set among the plurality of feature point sets, and a plurality of local features in the photographed image, wherein the plurality of projections are selected from a group consisting of one or more rotation projections, one or more enlargement projections, one or more reduction projections, and one or more deformation projections, determines a relative position of the mobile terminal device using the plurality of projections, determines position and posture information of the first virtual object based on the arrangement position and posture information for each of the plurality of feature point sets, the arrangement position and posture information being obtained from the identifiable information of some or all of the recognized feature point sets, and the relative position and posture information of the mobile terminal device with respect to each of the plurality of feature point sets, the relative position and posture information being determined from shapes and sizes of the plurality of feature point sets, determines a first depth distance between a viewpoint position of a virtual camera and the first virtual object using the plurality of feature point sets, determines a second depth distance between the viewpoint position of the virtual camera and the second virtual object using the plurality of feature point sets, determines whether the first virtual object is closer to the viewpoint position than the second virtual object based on the first depth distance and the second depth distance, and generates, in response to determining that the second virtual object is closer than the first virtual object and based on the first depth distance of the first virtual object, the second depth distance of the second virtual object, and the viewpoint position, a mixed-reality image in which an image of the second virtual object according to a viewpoint position is superimposed on the photographed image of the prescribed real space, wherein a first portion of the second virtual object is superimposed on the first virtual object in the mixed-reality image in response to determining that the second virtual object is closer to the viewpoint position than the first virtual object, wherein a second portion of the first virtual object is not displayed in the mixed-reality image based on the first depth distance of the second portion of the first virtual object being located behind the real object in the prescribed real space, wherein the plurality of feature point sets comprise five or more of feature point sets that are AR markers, and wherein the mobile terminal device, at prescribed time intervals, recognizes each of the five or more feature point sets taken by the photographing device to determine the viewpoint position for generating the mixed-reality image.

12. A non-transitory computer readable medium storing a program executed by a mobile terminal device in a mixed reality system for displaying, on a display for displaying a first virtual object to a user present in a prescribed real space, a mixed-reality image in which an image of the first virtual object arranged in a virtual space corresponding to the prescribed real space is superimposed on a photographed image of the prescribed real space, the mixed reality system comprising the mobile terminal device having the display and a photographing device that photographs the prescribed real space, wherein:

the mixed reality system
includes a plurality of feature point sets arranged in the prescribed real space, the plurality of feature point sets including identifiable information that allows identification of each of the plurality of feature point sets, and at least three feature point sets among the plurality of feature point sets being arranged so as to have pre-defined positional relationships; and the program causes the mobile terminal device to execute
a step of recognizing each of the plurality of feature point sets photographed by the photographing device,
a step of determining a plurality of projections using a homography matrix, a template image of a feature point set among the plurality of feature point sets, and a plurality of local features in the photographed image, wherein the plurality of projections are selected from a group consisting of one or more rotation projections, one or more enlargement projections, one or more reduction projections, and one or more deformation projections, a step of determining a relative position of the mobile terminal device using the plurality of projections, a step of determining position and posture information of the first virtual object, obtained in advance, that corresponds to a real object present in the prescribed real space and that defines the virtual space, based on arrangement position and posture information in the virtual space in which each of the plurality of feature point sets is arranged, the arrangement position and posture information being obtained from the identifiable information of some or all of the recognized feature point sets, and the relative position and posture information of the mobile terminal device with respect to each of the plurality of feature point sets, the relative position and posture information being determined from shapes and sizes of the plurality of feature point sets, a step of determining a first depth distance between a viewpoint position of a virtual camera and the first virtual object using the plurality of feature point sets, determine a second depth distance between the viewpoint position of the virtual camera and a second virtual object using the plurality of feature point sets, determine whether the first virtual object is closer to the viewpoint position than the second virtual object based on the first depth distance and the second depth distance, and a step of generating, in response to determining that the second virtual object is closer than the first virtual object and based on the first depth distance of the first virtual object, the second depth distance of the second virtual object, and the viewpoint position, a mixed-reality image in which an image of a second virtual object according to a viewpoint position is superimposed on the photographed image of the prescribed real space, wherein a first portion of the second virtual object is superimposed on the first virtual object in the mixed-reality image in response to determining that the second virtual object is closer to the viewpoint position than the first virtual object, wherein a second portion of the first virtual object is not displayed in the mixed-reality image based on the first depth distance of the second portion of the first virtual object being located behind the real object in the prescribed real space, wherein the plurality of feature point sets comprise five or more of feature point sets that are AR markers, and wherein the mobile terminal device, at prescribed time intervals, recognizes each of the five or more feature point sets taken by the photographing device to determine the viewpoint position for generating the mixed-reality image.

* * * * *